(12) United States Patent
Arai et al.

(10) Patent No.: US 8,579,557 B2
(45) Date of Patent: Nov. 12, 2013

(54) DRILL

(75) Inventors: Koichi Arai, Tottori (JP); Giichi Arai, Tottori (JP); Katsuyo Kimura, Yonago (JP)

(73) Assignee: BIC Tool Co., Ltd., Saiku-gun, Tottori (JP)

(*) Notice: Subject to any disclaimer, the term of this patent is extended or adjusted under 35 U.S.C. 154(b) by 0 days.

(21) Appl. No.: 13/816,895

(22) PCT Filed: Feb. 6, 2012

(86) PCT No.: PCT/JP2012/052622
§ 371 (c)(1),
(2), (4) Date: Feb. 13, 2013

(87) PCT Pub. No.: WO2012/117809
PCT Pub. Date: Sep. 7, 2012

(65) Prior Publication Data
US 2013/0142583 A1    Jun. 6, 2013

(30) Foreign Application Priority Data

Mar. 3, 2011 (JP) ................... 2011-046991
Aug. 17, 2011 (JP) ................... 2011-178567

(51) Int. Cl.
*B23B 51/02* (2006.01)
(52) U.S. Cl.
USPC .......................... 408/230; 408/227
(58) Field of Classification Search
USPC .......................... 408/227, 229, 230
IPC ......................................... B23B 51/02
See application file for complete search history.

(56) References Cited

U.S. PATENT DOCUMENTS 2,193,186 A * 3/1940 Bannister ............... 408/223
2,936,658 A * 5/1960 Riley ..................... 408/230
(Continued)

FOREIGN PATENT DOCUMENTS

JP    60-194411 U    12/1985
JP     2-63912 U     5/1990
(Continued)

OTHER PUBLICATIONS

JP App. No. 2011-178567, Office Action mailed Mar. 26, 2012, immediately prior to the decision to grant JP App. No. 2011-178567.
(Continued)

*Primary Examiner* — Eric A Gates
(74) *Attorney, Agent, or Firm* — Larry E. Henneman, Jr.; Gregory P. Gibson; Henneman & Associates, PLC

(57) ABSTRACT

[Problem] To provide a drill which enables a great reduction in cutting resistance and easy performance of a drilling operation by human power using a hand drill, a drilling machine, or the like.
[Solution] A drill has two cutting edges formed symmetrically with respect to a rotation axis, and is subjected to thinning at the tip thereof. The cutting edge is configured from a thinned cutting edge (1) which extends in a shape including a curved line from a chisel edge to the outer peripheral side of the drill, and a main cutting edge (2) which extends from the end of the thinned cutting edge to the outer peripheral end of the drill when viewed from the tip side of the drill, and a thinned surface formed by the thinned cutting edge is formed into an approximately parabolic shape inclined in a drill axis direction when viewed from the front side of the drill.

17 Claims, 15 Drawing Sheets

(56) References Cited

U.S. PATENT DOCUMENTS

| | | | |
|---|---|---|---|
| 4,222,690 A * | 9/1980 | Hosoi | 408/230 |
| 5,338,135 A | 8/1994 | Noguchi et al. | |
| 5,590,987 A * | 1/1997 | Bouzounie | 408/230 |
| 6,036,410 A * | 3/2000 | Shun'ko | 408/230 |
| 6,071,046 A * | 6/2000 | Hecht et al. | 408/225 |
| 2008/0089753 A1 | 4/2008 | Takikawa | |

FOREIGN PATENT DOCUMENTS

| | | | | |
|---|---|---|---|---|
| JP | 04-315512 A | | 11/1992 | |
| JP | 07-040119 A | | 2/1995 | |
| JP | 07-164228 A | | 6/1995 | |
| JP | 10156613 A | * | 6/1998 | B23B 51/00 |
| JP | 2000-271811 A | | 10/2000 | |
| JP | 2002-126925 A | | 5/2002 | |
| JP | 2003291012 A | * | 10/2003 | B23B 51/00 |
| JP | 2003291019 A | * | 10/2003 | B23B 51/00 |
| JP | 2006088267 A | * | 4/2006 | |
| JP | 2008-093805 A | | 4/2008 | |

OTHER PUBLICATIONS

JP App. No. 2011-178567, English translation of the patentable claims, 2012.

International App. No. PCT/JP2012/052622, International Search Report mailed Apr. 10, 2012.

International App. No. PCT/JP2012/052622, Written Opinion mailed Apr. 10, 2012.

International App. No. PCT/JP2012/052622, International Preliminary Report on Patentability (Chapter II) dated Aug. 21, 2012.

International App. No. PCT/JP2012/052622, English translation of the claims having Novelty, Inventive Step, and Industrial Applicability as indicated by the IPRP (Ref. AO), 2012.

JP App. No. 2011-046991, Office Action drafted May 24, 2011 immediately prior to the decision to grant JP App. No. 2011-046991.

JP App. No. 2011-046991, English translation of the patentable claims, 2011.

* cited by examiner (a)

(b)

(a)

(b)

(a)

(b)

(a)

(b)

(a)

(b)

(a)

(b)

(a)

(b)

(a)

Curved surface (rake)

(b)

Curved surface (c)

Curved surface (a)

(b)

(c)

DRILL

TECHNICAL FIELD

The present invention relates to a drill, in particular, a drill preferably used for drilling holes by manpower using a hand drill, a drill press or the like.

BACKGROUND OF THE INVENTION

Recently, among machine tools such as machining centers etc, fully automatic types allowing unmanned processing are becoming the mainstream and thus many kinds of drills corresponding to the fully automatic types have been developed and sold. However, drills used for devices requiring operator's power to drill holes, such as a hand drill or a drill press, have not been positively researched or developed. As a result, drills in almost same configurations have been used over several decades.

Since the drills used for the hand drill and drill press etc drill holes with the use of operator's arm strength, they have problems in drilling holes if drilling resistance is high. However, manufacturers of drills have spent little time on research for decreasing the high drilling resistance. It is partly because they thought these conventional drills should be firstly assured for their strength and stiffness, and because operators who bought drills actually used to grind by themselves and utilize the drills as they wanted.

Generally, a method for narrowing a chisel width by performing thinning on a cutting blade is known as a method for decreasing drilling resistance of a drill. (For example, see the following Patent Document 1). Usually, conventional thinning was performed from a central part to a heel part of the drill (see FIG. 16(a)), or only narrow area of the drill's central part (see FIG. 16(b)). In the FIGS. 16(a) and (b), a part on which thinning was performed is hatched and a cutting blade shaped by thinning is shown as (S1). Although these drills on which thinning is performed have more effect on reduction of drilling resistance compared to drills on which no thinning is performed (see FIG. 16(c)), they do not have enough resistance reduction effect if they are used for drilling holes with man power using such as a hand drill or a drill press, and thus an operator must withstand heavy strain on his arms.

In the following patent document 2, the present applicant proposes a drill preferably used for exfoliating a spot welding part of a car's body which is made of high hardness steel sheets. This drill has two cutting blades which are symmetrical about the axis of rotation, has a tip part on which thinning is performed, and has 0.05-0.3 mm chisel width, and its thinning is performed at an inclined angle of 1-4° toward the straight line joining blade edges of both cutting blades when seen from the drill's tip side. According to the document 2, this drill has less thrust resistance at the time of drilling and requires less power applied by an operator compared to conventional drills, since its chisel width is narrow and thinning is performed at said angle. However, this drill has a rake angle shaped by thinning to more than 90° in order to correspond to the high hardness steel sheets. Therefore, the drilling force of the central part becomes weak, and at the time of drilling with a hand drill, significant power would be required while the drilling by the drill tip from a central part to a peripheral cutting blade has been performed, sinking into the workpiece. Moreover, a tip tends to chip when used since the chisel width is very narrow, and in particular, a tip of a drill made from powder high-speed steel becomes fragile and more easily chipped.

Furthermore, the following patent documents 3 and 4 also describe the drills on which thinning is performed, respectively. The drill described in the patent document 3 is used for deep hole machining and has longer thinning cutting blade for the purpose of providing enough space with a thinning pocket (a recess defined by thinning face) and smoothly discharging swarf from the thinning pocket. The drill described in the patent document 4 is a small-diameter drill for a wired printed plate and general thinning is performed on the drill preventing the drill made from cemented carbide from chipping in order to drill holes on a resin board including glass fiber. Additionally, the drill described in the following patent document 1 is a twist drill which has x shape thinning.

Thinning has been performed on every drills described in the patent documents 1, 3, and 4, but the thinning was not done for decreasing drilling resistance. Therefore, in some cases, drilling resistance may be increased but not decreased by its thinning and thus these drills cannot obtain acceptably high efficiency enough to drill holes taking advantage of manpower, such as a hand drill.

PRIOR-ART DOCUMENTS

Patent Documents

Patent document 1: Tokukai 2000-271811
Patent document 2: Tokukai 2006-88267
Patent document 3: Tokukaihei 7-40119
Patent document 4: Tokukaihei 7-164228

SUMMARY OF THE INVENTION

Problems to be Solved by the Invention

The present invention is made to solve the problems of above-described Prior-Art, and proposes a drill which can substantially decrease drilling resistance, and allow for easy hole-drilling by manpower using a hand drill, a drill press, and the like.

Means for Solving the Problems

The present invention relates to a drill with a tip part on which thinning is performed, comprising two cutting blades which are formed symmetrical about an axis of rotation, the cutting blades consisting of a thinning cutting blade extending from a chisel edge toward a peripheral side of the drill to become a shape including curves when seen from tip side of the drill, and a main cutting blade extending from an end part of the thinning cutting blade to the peripheral end of the drill, wherein a ridge line of a boundary between a slot for emitting chips and a thinning surface shaped by the thinning cutting blade is substantially u-shaped, inclining toward the drill axis direction and toward a direction in which the ridge line moves from the thinning cutting blade side to the main cutting blade side as it moves from the drill's tip side to the base end side, when seen from front side of the drill which is an aperture side of the slot, and wherein a rake angle $\theta1$ formed by the main cutting blade and a rake angle $\theta2$ formed by the thinning cutting blade satisfy $\theta1 > \theta2 > 0°$, except for a part just below the chisel.

In a more particular embodiment, the present invention relates to a drill wherein an extension line extending in a drill tip direction along a line along the deepest portion of the thinning surface is offset to heel side or cutting blade side of the drill, without crossing the central part of the drill tip, when seen from the front side of the drill.

In a still more particular embodiment, the present invention relates to a drill wherein the width of the offset is equal to or smaller than 10% of a drill diameter.

In another more particular embodiment, the present invention relates to a drill wherein the extension line is offset to the heel side of the drill.

In another more particular embodiment, the present invention relates to a drill wherein the extension line is offset to the cutting blade side of the drill.

In another particular embodiment, the invention relates to a drill wherein an extension line extending in a drill tip direction a line along the deepest portion of the thinning surface crosses the central part of the drill tip, when seen from the front side of the drill.

According to another particular embodiment, the present invention relates to a drill, wherein a rake angle is formed in a part including a part just below the chisel of the thinning cutting blade.

In yet another particular embodiment, the present invention relates to a drill, wherein a rake angle is formed in a part which is adjacent to but does not include a part just below the chisel of the thinning cutting blade.

Effects of the Invention

According to the invention, there is a drill provided which can substantially decrease drilling resistance compared with the conventional drill and can easily drill holes by manpower using a hand drill, a manual drill press, or the like. Moreover, the reduction of drilling resistance improves drilling accuracy and reduces the time to drill holes, leading to improvement of working efficiency. Furthermore, it also allows for significant increase in the drill's life span. Besides, a rake angle $\theta_1$ formed by the main cutting blade and a rake angle $\theta_2$ formed by the thinning cutting blade satisfy $\theta_1 > \theta_2$, except for a part just below the chisel. Therefore, an apparent rake angle becomes smaller and the less portion of the blade edge digs deep into the workpiece, thereby making the cutting blade much easier to drill even if the drill is pressed against the workpiece by manpower such as a hand drill. Moreover, setting $\theta_2 > 0°$ prevents any failure as occurred if $\theta_2 \leq 0°$ is set (as the cutting resistance increases, the sharpness deteriorates).

Also according to the invention, an extension line extending in a drill tip direction a line along the deepest portion of the thinning surface is offset to heel side or cutting blade side of the drill, without crossing the central part of the drill tip, when seen from front side of the drill. Therefore, a distinct rake part can be formed from chisel to the cutting blade (including a portion of the heel part, too), or from chisel neighborhood, except for just below the chisel, to the cutting blade. This leads to significant improvement of sharpness of the cutting blade.

Furthermore, according to the invention, the width of the offset is equal to or smaller than 10% of a drill diameter and therefore the drilling resistance can be more surely decreased, which drastically improves high efficiency of the cutting blade.

Additionally, according to the invention, the extension line is offset to the heel side of the drill, and therefore a distinct rake part can be formed from chisel to the cutting blade (including a portion of the heel part, too). This results in a distinct cutting blade from the chisel part to the cutting blade part, and its drilling efficiency significantly improves. Furthermore, the drilling force obtained from the rotation of the drill generates from the moment the drill tip contacts a workpiece (since a rake is also provided at the drill tip, component force for the rake angle generates even by for example rotation of an air drill from the moment the drill contacts the workpiece, and this component force affects the workpiece), and the power which an operator needs to apply on the drill may be smaller. Additionally, the rake angle becomes comparatively larger and the drilling force becomes the largest, compared with the cases where the extension line is offset to the cutting blade side of the drill and where the extension line crosses the central part of the drill tip.

According to another embodiment of the invention, the extension line is offset to the cutting blade of the drill, and therefore a distinct rake is obtained from the chisel neighborhood to the cutting blade, except for a part just below the chisel. Although there is no rake provided just below the chisel, the chisel width is much narrower than if the extension line is offset to the heel side (case 1), and the chisel width is substantially same as in the case the extension line crosses the central part of the drill tip (case 2). In addition, since a larger thinning part can be formed, drilling resistance can be decreased and the high efficiency equal to or greater than that of the above-described two cases (cases 1 and 2) can be obtained even if no rake is provided just below the chisel.

Also, according to the invention, the extension line extending in a drill tip direction a line along the deepest portion of the thinning surface crosses the central part of the drill tip, when seen from front side of the drill. Therefore, a distinct cutting blade is shaped from the chisel neighborhood, except for a part just below the chisel, to the cutting blade part and the high drilling efficiency will significantly improve. Since the chisel width is reduced to a minimum, drilling resistance decreases instead and the same drilling force as obtained if the extension line is offset to the heel side, can be obtained.

In addition, according to the invention, a rake angle is formed in a part including a part just below the chisel of a thinning cutting blade. Therefore, the invention has the advantage that a rake angle is formed across all the parts contacting the workpiece from a part just below the chisel to the cutting blade, and all the parts serve as cutting blade, thereby increasing the drilling force (see the below-described FIG. 12 (a)).

In another embodiment of the invention, a rake angle is formed in a part which is adjacent to but does not include a part just below the chisel of the thinning cutting blade, and therefore the part contacting the workpiece, except for a part just below the chisel, serves as cutting blade. Although this can generate a drilling force a bit smaller than the force generated in the case if a rake angle is formed in a part including a part just below the chisel of a thinning cutting blade (case 3), a chisel tip part becomes narrower and the drilling resistance on the chisel tip part decreases, thereby obtaining the same drilling efficiency as obtained in the case 3 (see the below—described FIGS. 12 (b) and (c)). In addition, comparing with the case 3, this has the advantage that a thinning part can be much wider. Therefore, a thinning position can be changed and adjusted in accordance with workpiece materials and the drill diameter. Some ingenuity can be added. For example, if the workpiece is made of relatively hard materials or the drill diameter is larger, the thinning position can be moved to the cutting blade, and if the workpiece is made of soft materials or the drill diameter is smaller, the thinning position can be moved to the heel side.

DETAILED DESCRIPTION OF THE INVENTION

Figure 1:
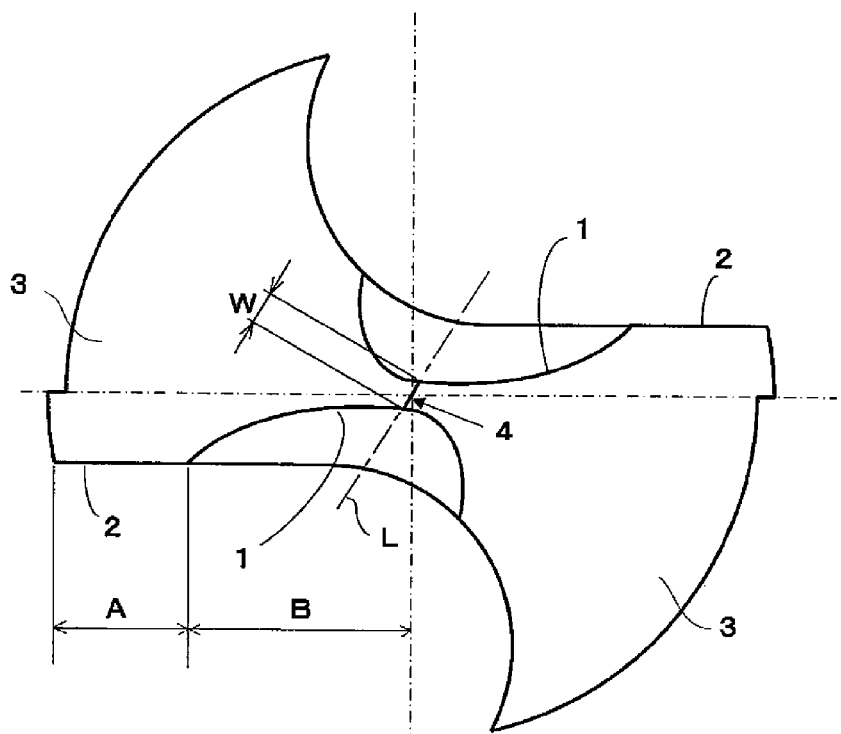
FIG. 1 It shows a drill according to the first embodiment of the present invention, (a) is a top view (a figure seeing the drill from the tip side), and (b) is a front view of the tip part.
Figure 1:
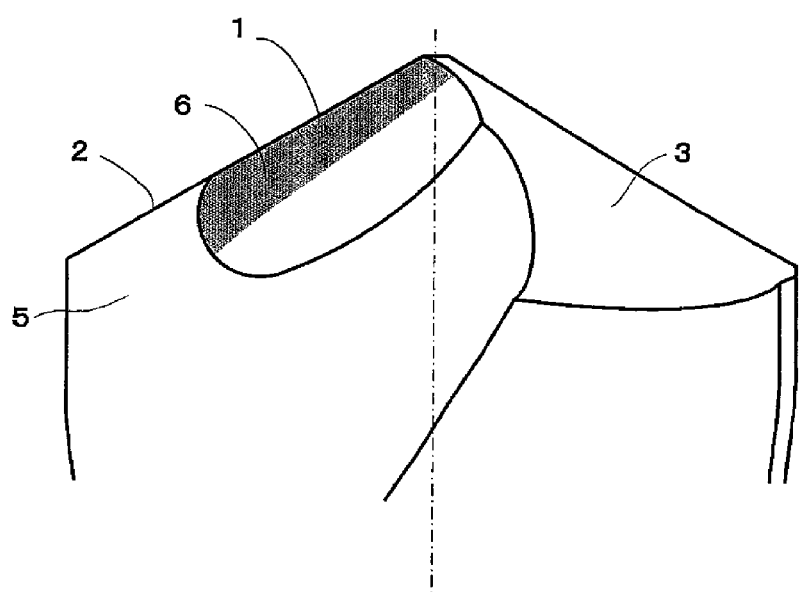

Hereinafter, preferred embodiments of the drill according to the present invention will be set forth with reference to the drawings. FIG. 1 shows the first embodiment of the drill according to the present invention, and (a) is a top view (a figure seeing the drill from the tip side), and (b) is a front view of the tip part.

The drill according to the present invention has two cutting blades which are formed symmetrical about an axis of rotation, and has a tip part on which thinning is performed. The cutting blades consist of a thinning cutting blade (1) extending from a chisel edge toward a peripheral side of the drill to become a shape including curves, and a main cutting blade (2) extending from an end part of the thinning cutting blade (1) to the peripheral end of the drill, when seen from tip side of the drill. In the illustrated example, the main cutting blade (2) extends in a linear fashion from an end part of the thinning cutting blade (1) to the peripheral end of the drill, but it may extend in a curved fashion, in a linear fashion, and in a linear and curved fashion. This is common in all the embodiments of the present invention. In the illustrated drawing, (3) is a frank face, (4) is a chisel, (5) is a rake face shaped by the main cutting blade (2), (6) is a new rake face shaped by thinning, and (W) is a chisel width.

Given that regarding the length of the cutting blade in the extending direction of the main cutting blade (2), the length of the main cutting blade (2) is (A) and the length of the thinning cutting blade (1) is (B), the drill of the first embodiment satisfies 0<A≤B. If the length (B) of the thinning cutting blade (1) is set to be equal to or larger than the length (A) of the main cutting blade (2), the drill can, in some cases, significantly decrease drilling resistance compared with the conventional drill which satisfies A>B, as shown in the examples and comparative examples described below. However, in the present invention as shown in the embodiments (see FIG. 9 and FIG. 11) described later, A>B may be also preferable.

With reference to the drill of the first embodiment, it is desirable to lengthen the length (B) of the thinning cutting blade (1) and to shorten the length (A) of the main cutting blade (2) as much as possible, since the higher the percentage (B/(A+B)) of the length (B) of the thinning cutting blade (1) in the total length of the cutting blade (A+B) is, the more the drilling resistance is decreased. However, if the length (A) of the main cutting blade (2) is 0, profile irregularity of the drilled hole will be reduced. Therefore, A is required to be larger than 0 (0<A). It is preferable to set the lengths so that it can satisfy R×0.1≤A with respect to a drill radius (R).

Figure 2:
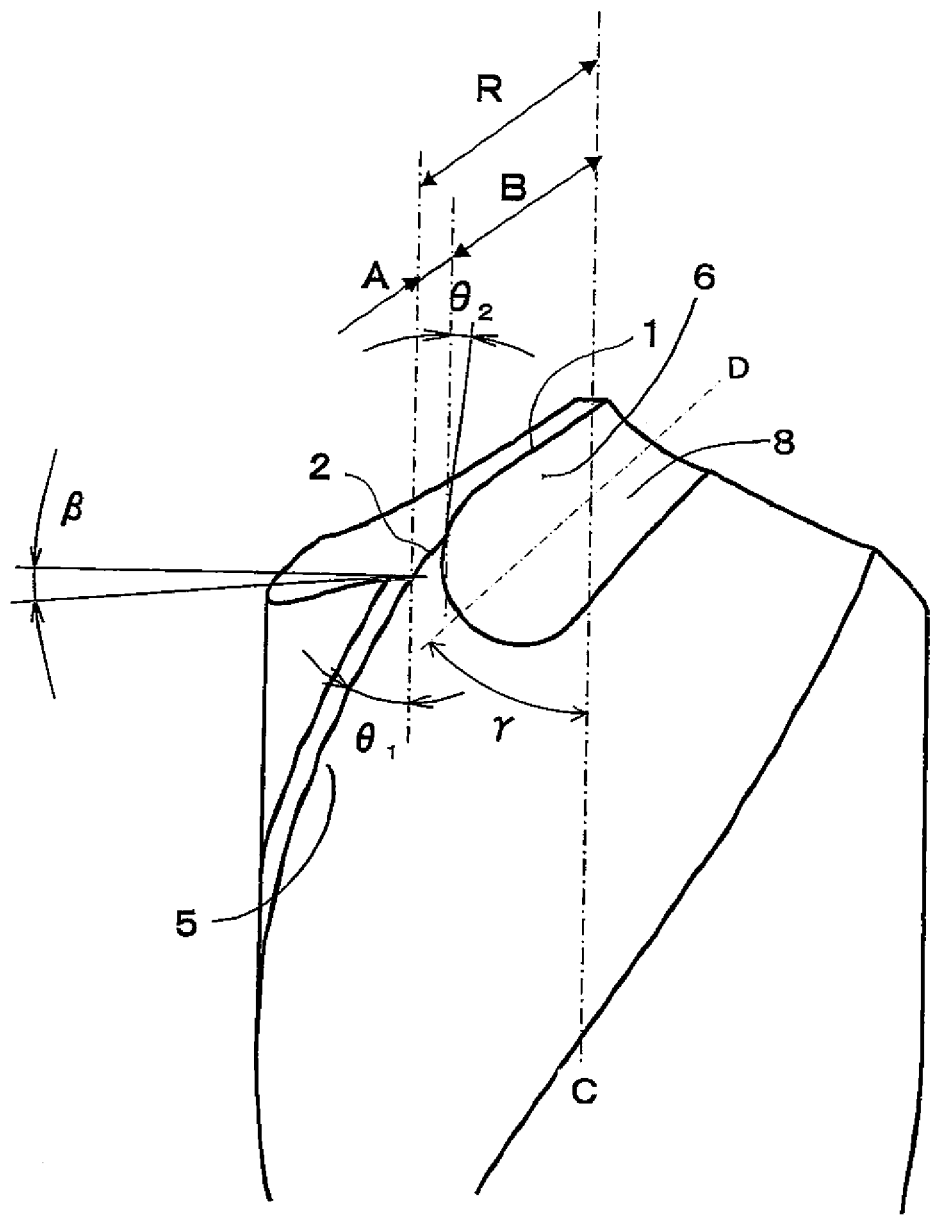
FIG. 2 It shows the drill according to the present invention seen from only slightly left to the FIG. 1(b).

FIG. 2 shows a drill of the first embodiment seen from only slightly left to the front side. The rake angle ($\theta_1$) formed by the main cutting blade (2) and the rake angle ($\theta_2$) formed by the thinning cutting blade (1) satisfy $\theta_1 > \theta_2 > 0°$. However, it becomes $\theta_2 \approx 0°$ ($\theta_2 < 0°$, almost 0°) only just below a chisel (4). The fact that the rake angle ($\theta_2$) formed by the thinning cutting blade (1) is smaller than the rake angle ($\theta_1$) formed by the main cutting blade (2) means that the apparent rake angle becomes smaller by thinning. The larger the rake angle is, the more the portions of the blade edge dig deep into the workpiece. It causes no problem when the drill is rotated by a power source such as a mechanical tool, but it does cause a problem when for example, the drill is pressed against the workpiece by manpower such as a hand drill, and consequently the cutting blade has trouble in drilling the workpiece due to a lack of the manpower against load. In the present invention, the thinning cutting blade (1) is shaped to satisfy $\theta_1 > \theta_2$, so that the apparent rake angle is set to be smaller and the less portion of the blade edge diggs into the workpiece, thereby making the cutting blade much easier to cut even if the drill is pressed against the workpiece by manpower, such as a hand drill.

The reason for setting $\theta_2 > 0°$ is if the rake angle ($\theta_2$) formed by the thinning cutting blade (1) is ≤0°, drilling resistance will actually increase and the drilling efficiency will deteriorate. With reference to the conventional drill, thinning is performed so that the rake angle can be minus for the reason that if the rake is provided in the central part, a blade edge can be easily chipped.

There are some helix angles of a drill depending on a kind of drills, and the helix angle is generally set at around 30°. However, at this angle, drilling resistance is large and it is not appropriate for drilling holes by manpower using a hand drill. Although some methods reduce drilling resistance by making a helix angle smaller and thus making a rake angle smaller, a method of changing apparent rake angle by thinning only, like the present invention, without changing the original helix angle of around 30° rather than producing a drill by changing the helix angle has the advantage of doing this extremely easily.

Figure 6:
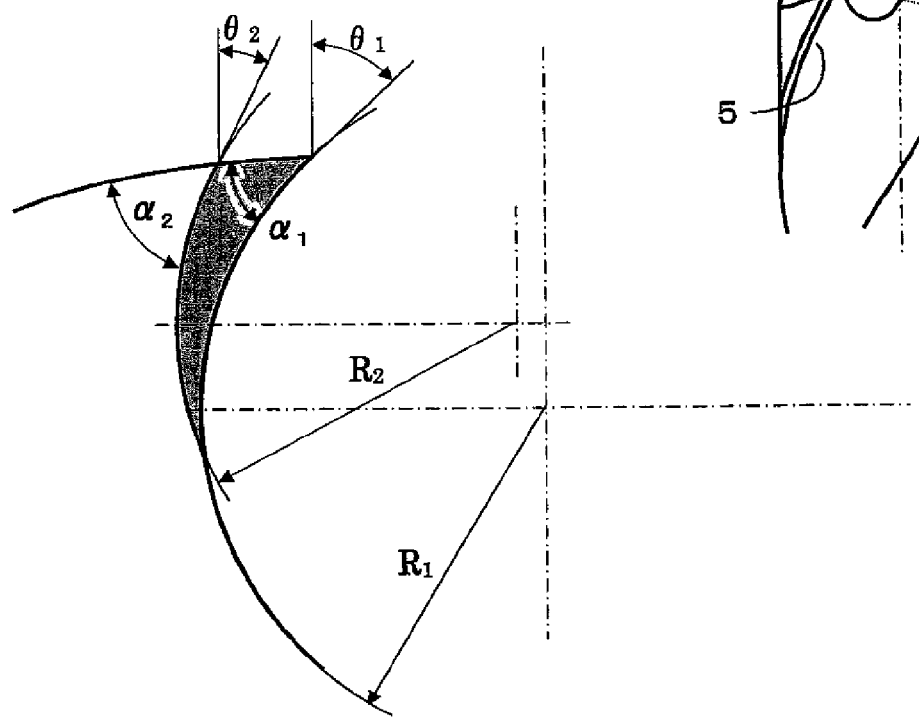
FIG. 6(a) shows a cross sectional view perpendicular to the thinning part, and (b) shows a cross-sectional part (A-A cross section) of (a).
Figure 6:
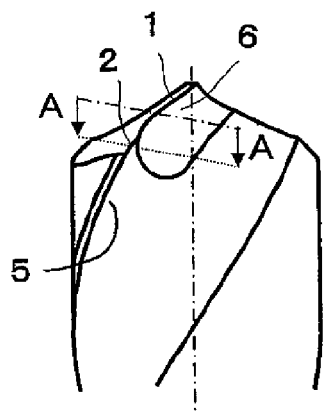

An included angle ($\alpha 1$) formed by the main cutting blade (2) and the included angle ($\alpha 2$) formed by the thinning cutting blade (1) satisfy $\alpha 1 < \alpha 2 < 90°$ (See FIG. 6 for $\alpha 1$ and $\alpha 2$).

Here, supplementary explanation about the rake angle and an included angle will be added. With reference to the rake angle (rake angle before thinning formation) which the drill originally has, the included angle is too sharp and the blade edge digs deep into the workpiece like a wedge, thereby increasing the drilling resistance. By performing thinning, the rake angle reduces and the included angle increases, thereby improving the drilling efficiency (decreasing drilling resistance). In particular, according to the thinning performed on the drill, a loose rake angle and a larger included angle suitable for an operator's arm strength will be generated.

A clearance angle ($\beta$) is set to satisfy $0°<\beta<8°$. Preferably, it is set to satisfy $0°<\beta\leq4°$. Generally, it is considered that high drilling efficiency can be obtained by forming a sharp blade edge by setting the clearance angle larger and the rake angle larger, and thus commercially-available drills have this kind of profile in common. However, if the clearance angle is set to be larger as well as the rake angle, the blade edge gets sharper, more portions of the blade edge dig deep into the workpiece and thus it has trouble in drilling the workpiece if the drill is pressed against the work piece by manpower such as a hand drill. In the present invention, setting the clearance angle smaller, at $0°<\beta\leq4°$ allows less portions of the blade edge to dig deep into the workpiece, and the blade can easily cut even if the drill is pressed against the workpiece by manpower, such as a hand drill.

Here, the clearance angle ($\beta$) is defined by the following (X) or (Y).

(X) An angle between whetstone's horizontal center line and drill's central axis line, obtained by aligning a center of the drill's tip part on the whetstone's horizontal center line of whetstone's periphery which has a radius of 50 mm or more, contacting the cutting blade of the drill's tip part with the whetstone's horizontal center line in a parallel (=horizontal) fashion, and moving the drill's posterior end below the whetstone's horizontal center line while setting the drill's tip part as a supporting point (See FIG. 3(a)).

(Y) An angle between whetstone's horizontal center line and drill's central axis line, obtained by aligning a center of the drill's tip part on the whetstone's horizontal center line of whetstone's lateral side (vertical surface), contacting the cutting blade of the drill's tip part with the whetstone's horizontal center line in a parallel (=horizontal) fashion, and moving the drill's posterior end below the whetstone's horizontal center line while setting the drill's tip part as a supporting point (See FIG. 3(b)).

Figure 3:
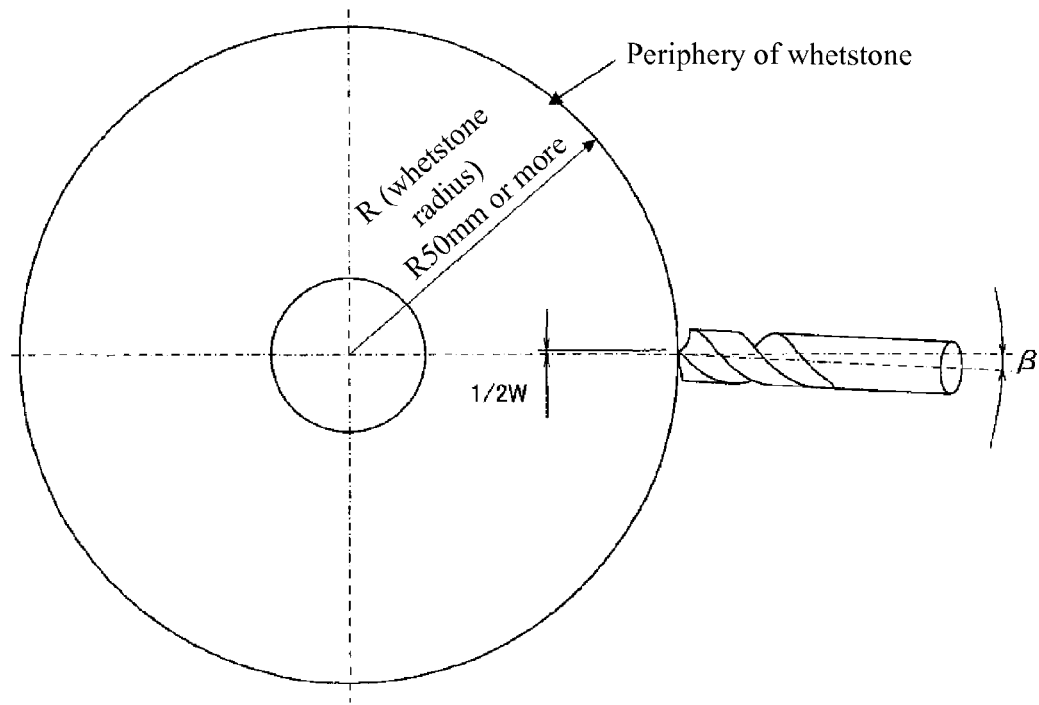
FIG. 3 It is a figure defining a clearance angle.
Figure 3:
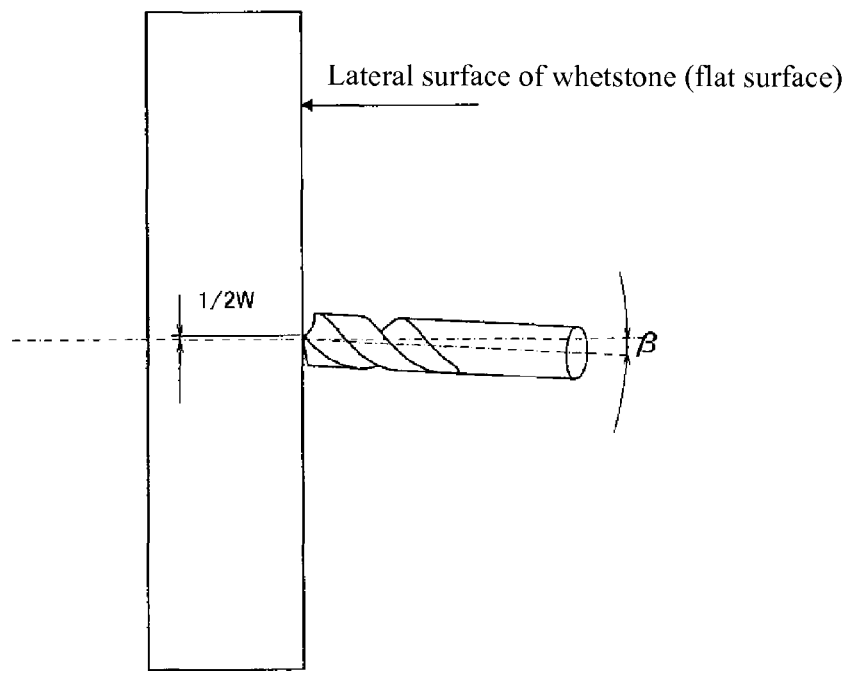

However, (X) and (Y) have small difference of a certain angle occurred by the whetstone's radius shown in FIG. 3(a) and a distance from the drill center to the cutting blade: ½ W (W: web thickness) (the angle is about 0.573°, if the web thickness (W) is 2 mm in the case of the whetstone's radius of 50 mm, the angle is about 0.286° in the case of a radius of 100 mm, and the angle is about 0.191° in the case of a radius of 150 mm). Therefore, if the clearance angle is obtained by (X), it is preferable to add this difference to (X). That is, the clearance angle is preferably obtained by the following formula.

(X) In the case of FIG. 3(a): the clearance angle=$\beta+\tan^{-1}((1-\cos(\sin^{-1}0.5W/R))R/0.5W)$ (Y) In the case of FIG. 3(b): clearance angle=$\beta$ For example, the actual clearance angle of a drill with a diameter of 10 mm and a web thickness of 2 mm which performs grinding with a whetstone with a radius (R) of 50 mm and a clearance of 3° will be about 3.573°.

It is preferable to set the chisel width (W) (see FIG. 1(a)) smaller so that the blade can easily cut the workpiece even if the drill is pressed against the workpiece by manpower such as a hand drill. Specifically, it is desirable to set the chisel width to 10% or less of a diameter of the drill. For example, if a drill diameter $\phi$ is 2-13 mm, the chisel width (W) is set to be in a range of 0.1-0.8 mm, depending on increase and decrease of the drill diameter.

In the present invention, an angle of thinning is set to be smaller compared with the conventional drill. Conventional thinning precedes strength and rigidity of the drill itself and thus sets larger the angle ($\theta$) of contacting the drill to the whetstone at the time of thinning formation. (See FIG. 4(a)). If the angle ($\theta$) is set to be as small as possible and the center of the drill is moved closer to a tangential line of a grinding surface of the whetstone, drilling resistance on a central part of the drill, called a web, will be reduced, resulting in significant reduction of the drilling resistance (See FIG. 4(b)).

In the present invention, it is desirable to set the angle of thinning so as to satisfy the following (I) and (II).

(I) The angle ($\theta$ of FIG. 4) between the drill's central axis line and a vertical center line of the whetstone which performs thinning is 0-20°.

Figure 5:
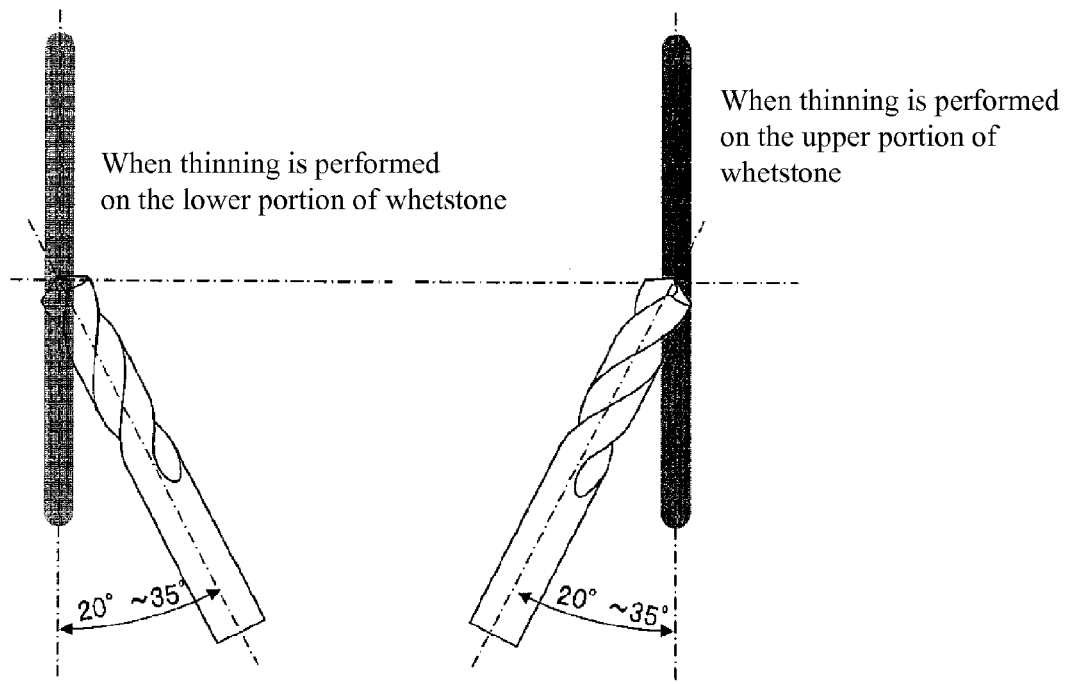
FIG. 5 It shows an angle of thinning.

(II) The angle between the drill's central axis line and a center line in the width direction of the whetstone which performs thinning is 20-35° (See FIG. 5).

However, a range of the angle of thinning of the above-described (II) is obtained in the case of a point angle of 118° and a helix angle of 30°, and is not necessarily preferable for all the drills. In theory, an upper limit of the thinning angle of the above-mentioned (II) can be set to a range of a half of the angle (i.e. if the angle is 118°, it is 59°) at a position (=a point angle) parallel to the blade edge of the drill.

Next, thinning shape will be set forth. FIG. 6(a) shows a cross sectional view (A-A cross section of FIG. 6(b)) perpendicular to the thinning part of the drill. In the example shown in FIG. 6(a), the edge part (a boundary part with the rake face (5) formed by the main cutting blade (2)) of the rake face (6) formed by thinning is ach-shaped by a radius (R2) of thinning. In addition, (R1) is a radius of a groove part of the drill. As illustrated, the rake angle ($\theta_1$) formed by the main cutting blade (2) and the rake angle ($\theta_2$) formed by the thinning cutting blade (1) satisfy $\theta_1>\theta_2>0°$. Furthermore, the included angle ($\alpha1$) formed by the main cutting blade (2) and the included angle ($\alpha2$) formed by the thinning cutting blade (1) satisfy $\alpha1<\alpha2<90°$.

Figure 7:
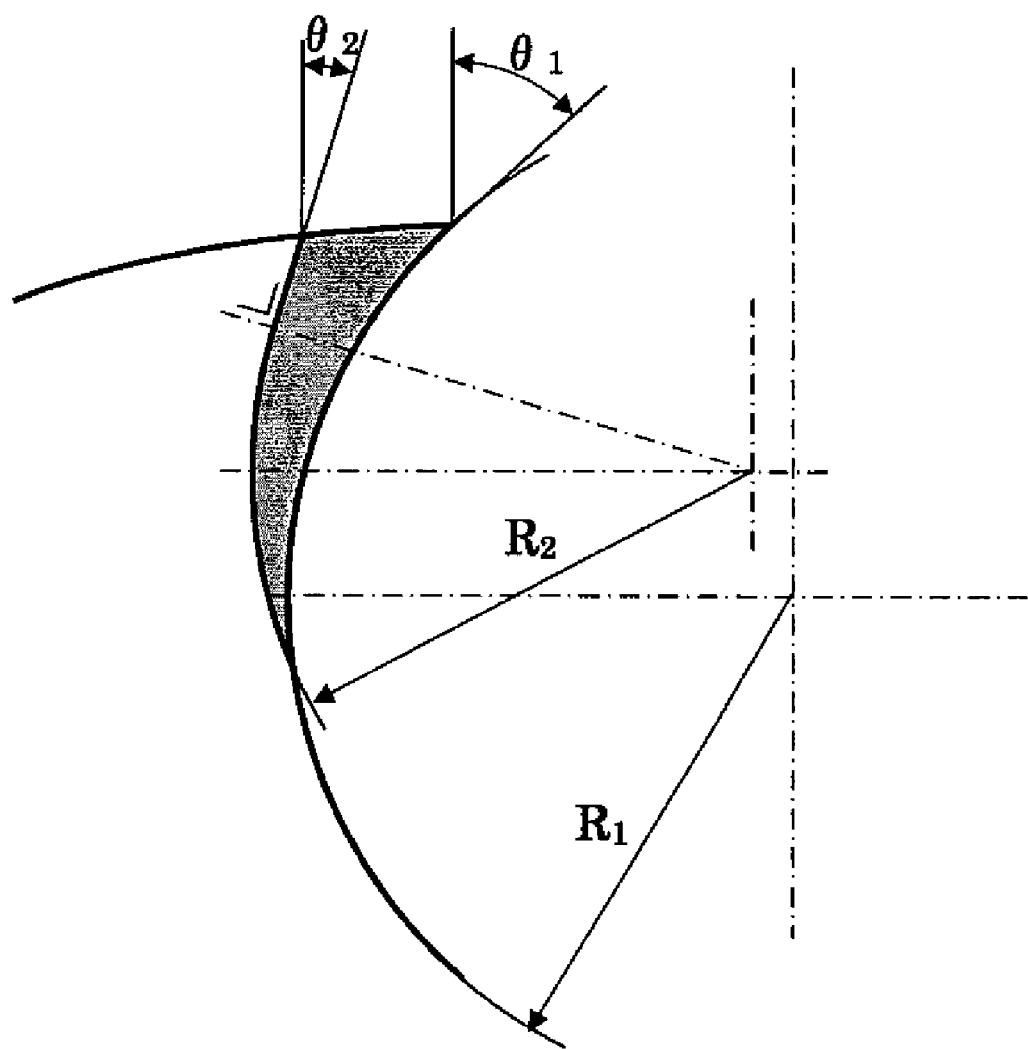
FIG. 7 It shows another example of the edge form of a rake face.

In the present invention, the edge form of the rake face may not only be an arc-shape but also a form combining an arc and a straight line (See FIG. 7.). The inventors confirmed through experiments that if the edge form of the rake face is an arc-shape (FIG. 6(a)) and a form combining an arc and a straight line (FIG. 7), cutting blades in both cases have equal drilling efficiency and have no difference in drilling resistance.

Figure 8:
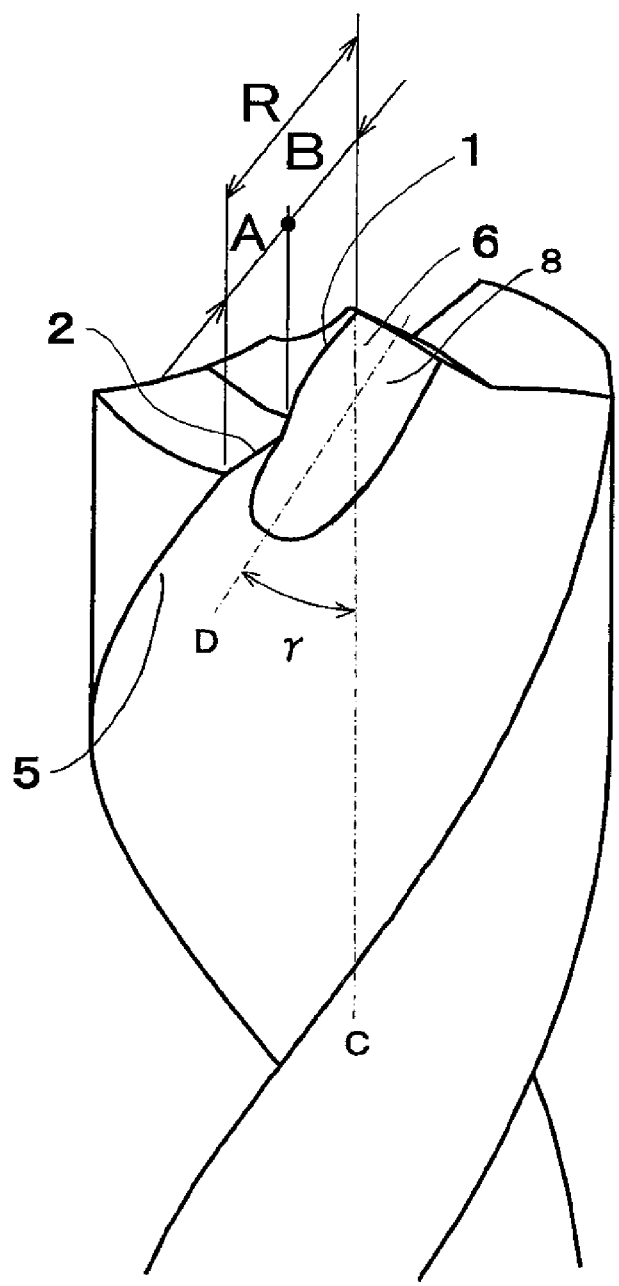
FIG. 8 It is a front view of an tip part showing another example (a drill for spot welding exfoliation) (the second embodiment) of the drill according to the present invention.

The drill according to the present invention may be a drill for spot welding exfoliation which has a form as shown in FIG. 8 (hereinafter, referred to as the second embodiment). In addition, in FIG. 8, same components as shown in the drill of FIG. 1 are given the same numerals. Given that regarding the length of the cutting blade in the extending direction of the main cutting blade (2), the length of the main cutting blade (2) is (A) and the length of the thinning cutting blade (1) is (B), the drill of the second embodiment also satisfies $0<A\leq B$. More preferably, the lengths are set to satisfy $R\times0.1\leq A$ with reference to a radius (R) of the drill. Moreover, it is preferable that the rake angle ($\theta_1$) formed by the main cutting blade and the rake angle ($\theta_2$) formed by the thinning cutting blade satisfy $\theta_1>\theta_2>0°$. Furthermore, it is preferable that the included angle ($\alpha1$) formed by the main cutting blade and the included angle ($\alpha2$) formed by the above-mentioned thinning cutting blade satisfy α1<α2<90°. In addition, the clearance angle (β) preferably satisfies 0°<β≤4°.

With reference to the drill according to the present invention, a ridge line of a boundary between a slot for emitting chips and a thinning surface (8) formed by thinning cutting blade (1) is substantially parabolic (substantially u-shaped), inclining toward the drill axis direction (C) when seen from front side of the drill (see FIG. 2 and FIG. 8). In the present invention, "front side of the drill" means an aperture side of a slot for emitting chips. As illustrated, the direction of tilt moves from the thinning cutting blade (1) side to the main-cutting-edge (2) side (diagonally downward left when seen from the front side) as it moves from the drill's tip side to the base end side. This can be applied to the below-described embodiments as well. The angle (γ) of the tilt is set to be in a range of 20-35° (for example, 27.5°). As mentioned above, this angle setting can be achieved by setting the angle between the center line in the width direction of the whetstone which performs thinning and the drill's central axis line in a range of 20-35° (See FIG. 5). In consideration of the helix angle of the drill, when thinning is performed, an angle of tilting the center of the whetstone (see an alternate long and short dash line (L) in FIG. 1(a)) may be preferably set to a range of helix angle −10° to helix angle +10°. However, in theory, this angle can be set to a range of helix angle −10° to ½ of the point angle on the cutting blade side. These configurations (the form of the thinning cutting blade, the direction of tilt, and the angle of tilt) are common to the drills of all the embodiments of the present invention.

Figure 9:
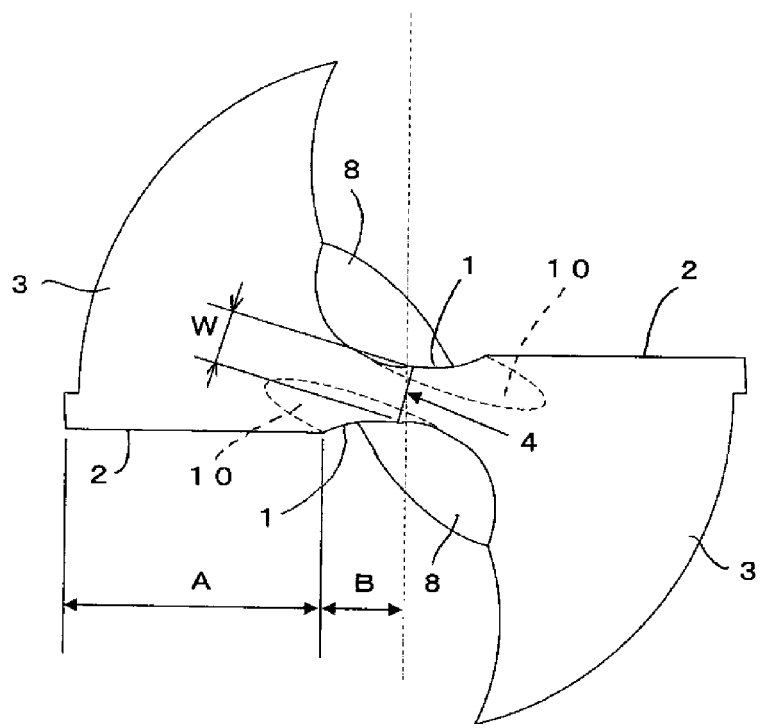
FIG. 9 It shows a drill of the third embodiment of the present invention, and (a) is a top view (a figure seeing the drill from the tip side), and (b) is a front view of the tip part.
Figure 9:
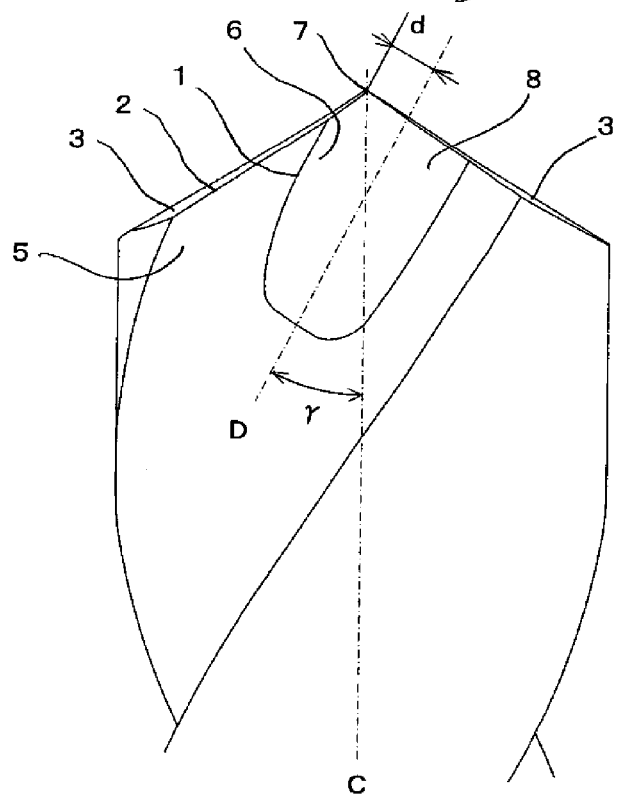

FIG. 9 shows the drill of the third embodiment of the present invention, and (a) is a top view (a figure seeing the drill from the tip side), and (b) is a front view of the tip part. Also, with reference to the drill according to the third embodiment, a thinning surface (8) formed by thinning cutting blade (1) is substantially parabolic (substantially u-shaped), inclining toward the drill axis direction (C) when seen from front side of the drill (see FIG. 9(b)). When an extension line (D) extending in a drill tip direction a line along the deepest portion (the deepest part cut by thinning) of the thinning surface (8) formed by the thinning cutting blade (1) is offset to heel side of the drill, without crossing the central part (7) of the drill tip, when seen from front side of the drill. Preferably, length of offset (d) is equal to or smaller than 10% of the drill diameter. This is because if it exceeds 10%, drilling resistance increases and drilling efficiency of the blade deteriorates.

The rake angle is formed in a part including a part just below the chisel (4) of the thinning cutting blade (1). In the FIG. 9(a), the numeral (10) shows the rake face forming the rake angle. Since the rake angle is formed in a part including a part just below the chisel (4), the portion (9) whose width in a direction parallel to the chisel is narrower than the chisel width (W) is formed just below the chisel (4) (See FIG. 12(a)).

Given that regarding the length of the cutting blade in the extending direction of the main cutting blade (2), the length of the main cutting blade (2) is (A) and the length of the thinning cutting blade (1) is (B), the drill of the third embodiment satisfies A>B. The rake angle ($\theta_1$) formed by the main cutting blade (2) and the rake angle ($\theta_2$) formed by the thinning cutting blade (1) satisfy $\theta_1>\theta_2>0°$. The rake angles also satisfy this just below the chisel (4).

Figure 10:
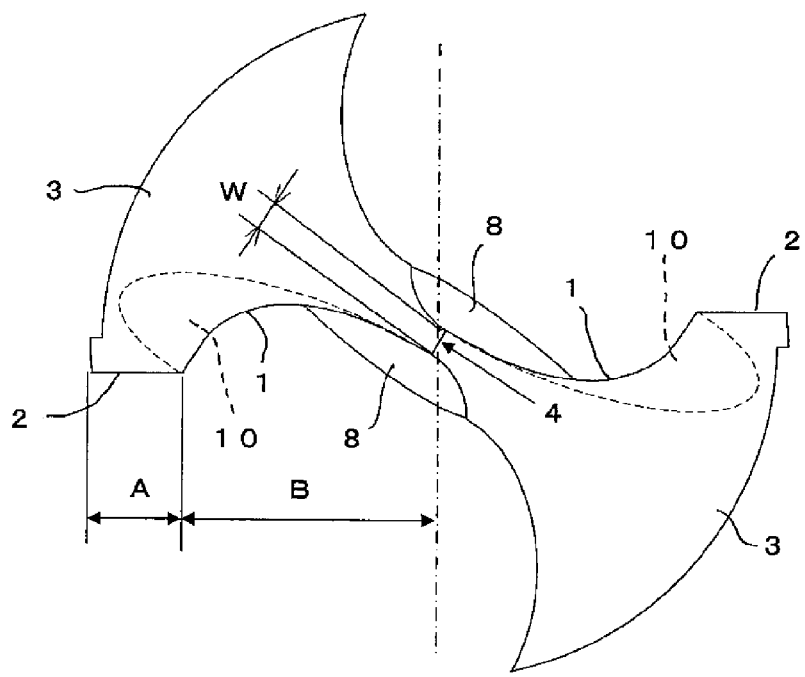
FIG. 10 It shows a drill of the fourth embodiment of the present invention, and (a) is a top view (a figure seeing the drill from the tip side), and (b) is a front view of the tip part.
Figure 10:
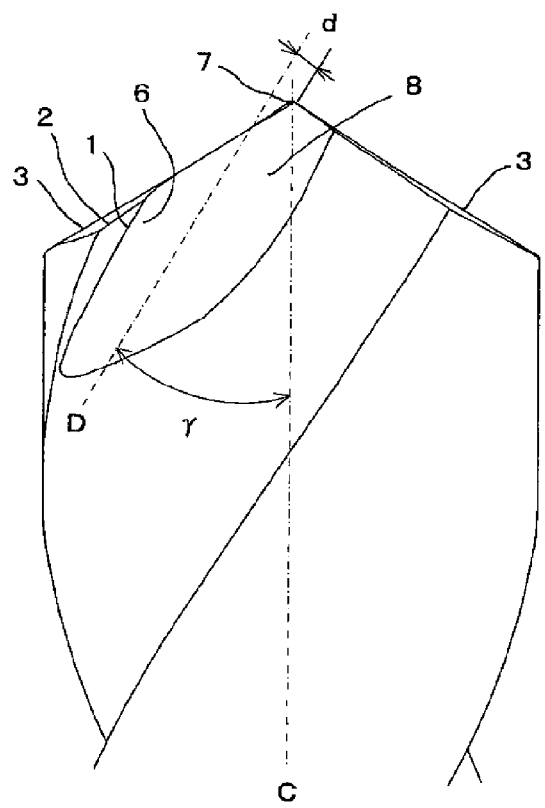

FIG. 10 shows the drill of the fourth embodiment of the present invention, and (a) is a top view (a figure seeing the drill from the tip side), and (b) is a front view of the tip part. Also, with reference to the drill according to the fourth embodiment, a thinning surface (8) formed by the thinning cutting blade (1) is substantially parabolic (substantially u-shaped), inclining toward the drill axis direction (C) when seen from front side of the drill (see FIG. 10(b)). When an extension line (D) extending in a drill tip direction a line along the deepest portion of the thinning surface (8) formed by the thinning cutting blade (1) is offset to cutting blade side of the drill, without crossing the central part (7) of the drill tip, when seen from front side of the drill. Preferably, length of offset is equal to or smaller than 10% of the drill diameter. This is because if it exceeds 10%, drilling resistance increases and drilling efficiency of the blade deteriorates.

The rake angle is formed in a part which is adjacent to but does not include a part just below the chisel (4) of the thinning cutting blade (1). More specifically, the rake angle is formed in the main cutting blade (2) side rather than just below the chisel (4) of the thinning cutting blade (1). In FIG. 10(a), the numeral (10) shows the rake face forming the rake angle.

Given that regarding the length of the cutting blade in the extending direction of the main cutting blade (2), the length of the main cutting blade (2) is (A) and the length of the thinning cutting blade (1) is (B), the drill of the fourth embodiment satisfies 0<A≤B. The rake angle ($\theta_1$) formed by the main cutting blade (2) and the rake angle ($\theta_2$) formed by the thinning cutting blade (1) satisfy $\theta_1>\theta_2>0°$. However, it becomes $\theta_2 \approx 0°$ ($\theta2<0°$, almost 0°) only just below the chisel (4).

Figure 11:
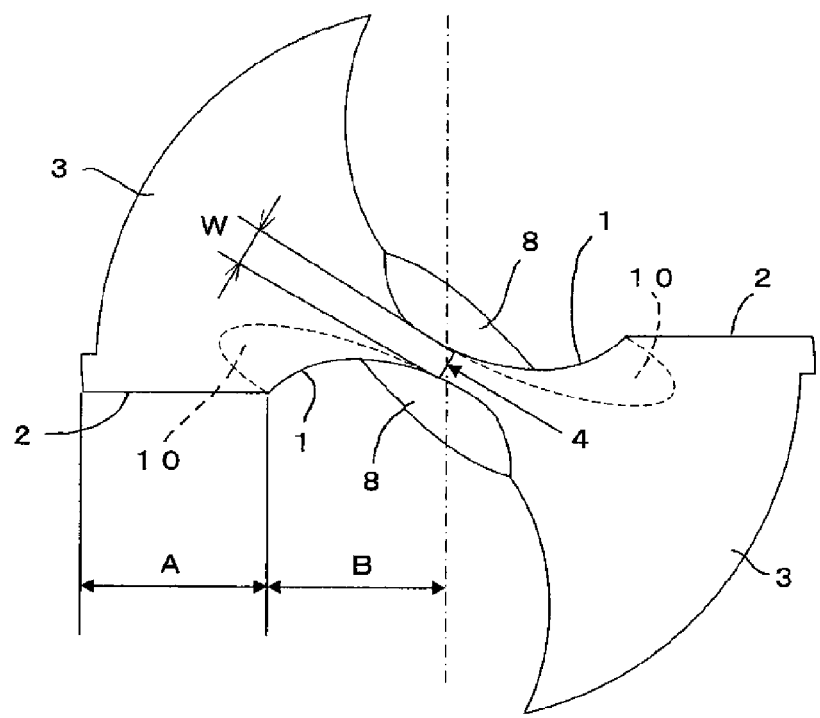
FIG. 11 It shows a drill of the fifth embodiment of the present invention, and (a) is a top view (a figure seeing the drill from the tip side), and (b) is a front view of the tip part.
Figure 11:
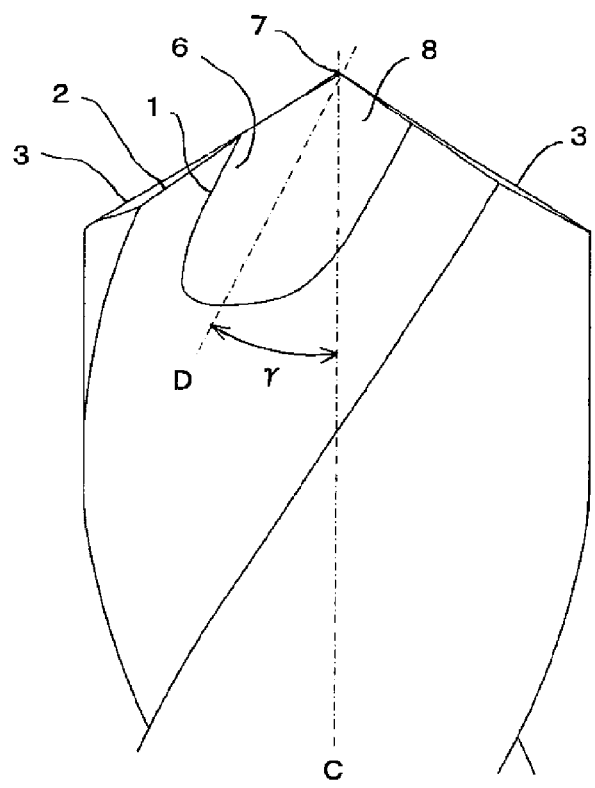

FIG. 11 shows the drill of the fifth embodiment of the present invention, and (a) is a top view (a figure seeing the drill from the tip side), and (b) is a front view of the tip part. Also, with reference to the drill according to the fourth embodiment, a thinning surface formed by the thinning cutting blade (1) is substantially parabolic (substantially U-shaped), inclining toward the drill axis direction (C) when seen from front side of the drill (see FIG. 11(b)). When an extension line (D) extending in a drill tip direction a line along the deepest portion of the thinning surface (8) formed by the thinning cutting blade (1) crosses the central part (7) of the drill tip, when seen from front side of the drill.

The rake angle is formed in a part which is adjacent to but does not include a part just below the chisel (4) of the thinning cutting blade (1). More specifically, the rake angle is formed in the main cutting blade (2) side rather than just below the chisel (4) of the thinning cutting blade (1). In FIG. 11(a), the numeral (10) shows the rake face forming the rake angle.

Given that regarding the length of the cutting blade in the extending direction of the main cutting blade (2), the length of the main cutting blade (2) is (A) and the length of the thinning cutting blade (1) is (B), the drill of the fifth embodiment satisfies A>B. The rake angle ($\theta_1$) formed by the main cutting blade (2) and the rake angle ($\theta_2$) formed by the thinning cutting blade (1) satisfy $\theta_1>\theta_2>0°$. However, it becomes $\theta_2 \approx 0°$ ($\theta_2<0°$, almost) 0° only just below the chisel (4).

With reference to the drills according to the above-mentioned third to fifth embodiments, as well as the drills of the above-mentioned first and second embodiments, the thinning cutting blade (1) has a feature of being substantially parabolic (substantially U-shaped), inclining toward the drill axis direction (C) when seen from front side of the drill. This can reduce the load on the chisel and narrow the chisel width even if the formula 0<A≤B is not satisfied. Specifically, the chisel width after thinning can be narrowed to about 3 to 5% of a drill diameter. Therefore, the drill can reduce the drilling resistance and thus obtain ultra-high efficiency of the blade, which exerts a great effect on drilling holes by manpower.

Figure 13:
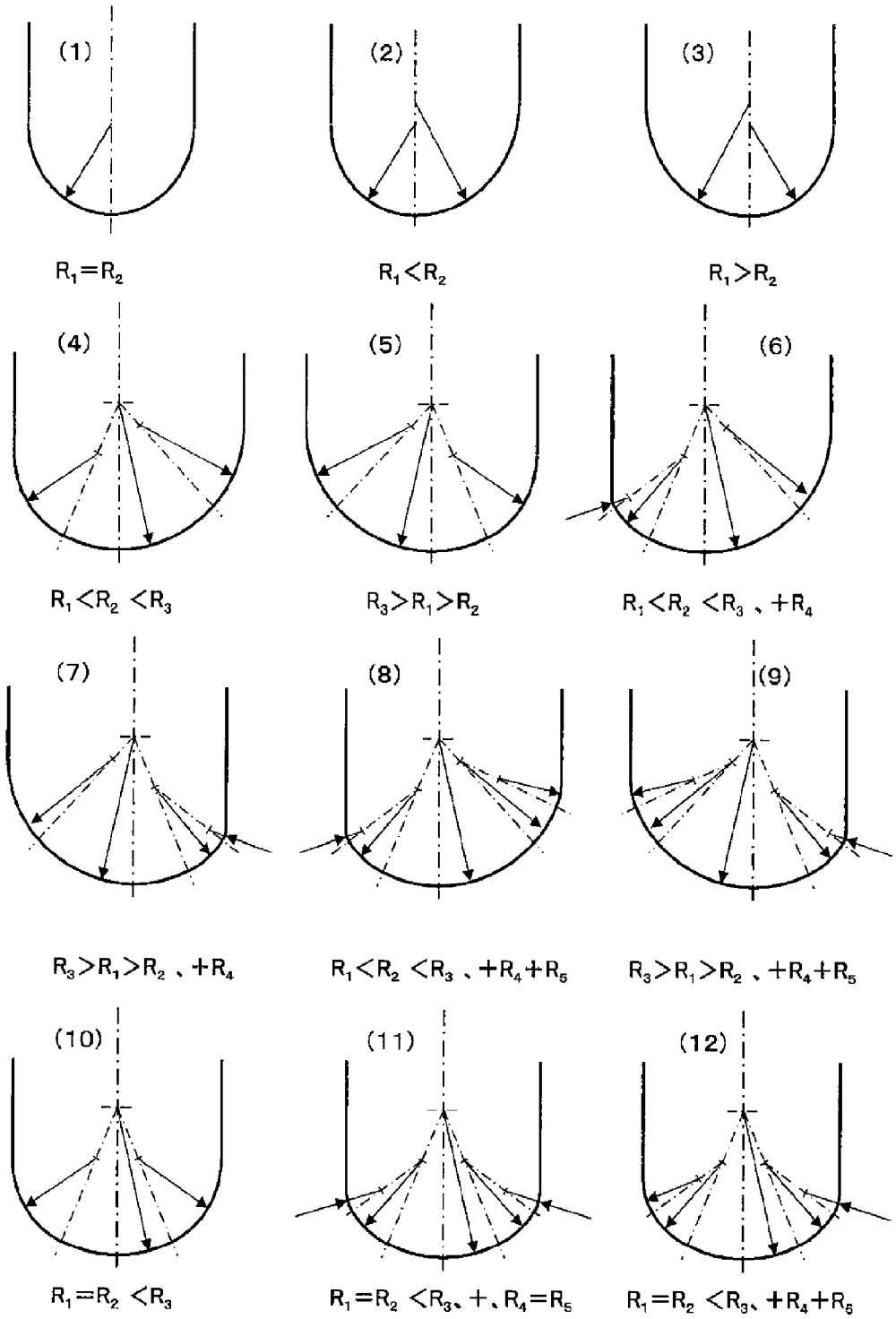
FIG. 13 It shows an example of the whetstone profile for generating the thinning cutting blade in the drill according to the present invention, and shows a rotational end part (a peripheral edge) of the whetstone.
Figure 14:
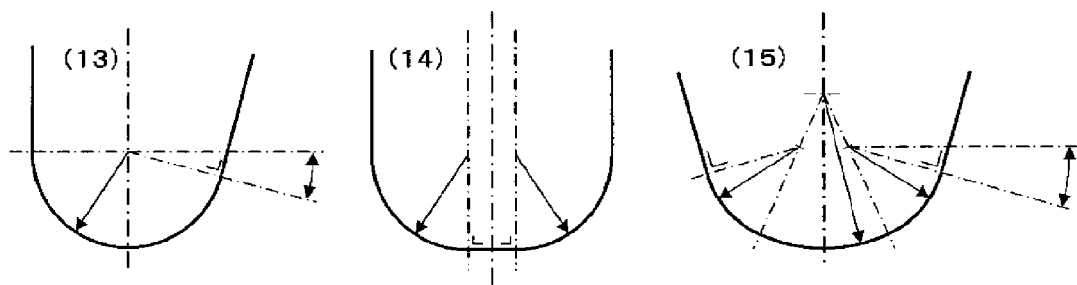
FIG. 14 It shows an example of the whetstone profile for generating the thinning cutting blade in the drill according to the present invention, and shows a rotational end part (a peripheral edge) of the whetstone.

Described below is the whetstone profile for the generation of the thinning cutting blade (1) in the drill according to the present invention. FIG. 13 and FIG. 14 illustrate an example of whetstone profile and a rotational end part (periphery part) of the whetstone. The whetstone has one or more radii of curvature in the rotational end part. One of the radii of curvature of the whetstone is R1 and this R1 is a radius for the generation of the thinning cutting blade that is mainly applied to the cutting blade. Next, a radius of curvature R2 forming a curved surface which is adjacent to R1 and smoothly connected with R1 is provided so that it mainly contacts with a heel part.

Based on the combination of the two radii of curvature, R1 and R2, a size relation of R1 and R2 (R1=R2, R1<R2, R1>R2) is altered, larger R3 is provided between R1 and R2 in order to correspond to a thicker drill, or smaller R4 and R5 are formed in a whetstone corner in order to converge a large radius of curvature to whetstone width, according to a ratio of a diameter and a core thickness of the drill as shown in FIG. 13. Moreover, a whetstone that combines one or more above-mentioned radii of curvature can also be used. Furthermore, thinning may also be performed by including a straight part between the R parts or providing a tilt on the side as shown in FIG. 14.

EXAMPLES

Hereinafter, the effect of the present invention will be clearer by showing test results on the drill in the examples and comparative examples below according to the present invention. However, the present invention is not limited to the following examples in any way.

1. A test based on the relation between a length of the main cutting blade (A) and a length of the thinning cutting blade (B)<

Test 1: The Relation Between a Length of the Main Cutting Blade (A) and a Length of the Thinning Cutting Blade (B)>

Six different kinds of thinning with B sizes shown in Table 1 were performed for a drill with Ø10 mm in diameter (R=5 mm in radius), and drills in the examples and comparative examples were produced. All Clearance angles of the drills were set as 4° and all chisel widths were set as 0.5 mm.

TABLE 1

|  | A (mm) | B (mm) |
|---|---|---|
| Example 1 | 0.5 | 4.5 |
| Example 2 | 1.0 | 4.0 |
| Example 3 | 2.0 | 3.0 |
| Example 4 | 2.5 | 2.5 |
| Comparative Example 1 | 3.0 | 2.0 |
| Comparative Example 2 | 4.0 | 1.0 |

Figure 15:
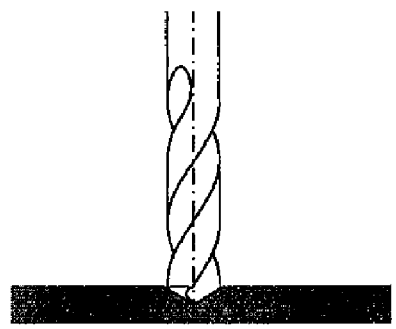
FIG. 15 It shows a test method of the drills of the examples and comparative examples.

Following the attachment of the drills in the above-mentioned examples and comparative examples to a rechargeable drill driver (manufactured by Panasonic), in all examples in Table 1, the same operator conducted a cutting operation until the peripheral cutting blade was sunk into a metal plate (quality of the material SS400 and 9 mm in thickness) by manpower (see FIG. 15). Operators evaluated the ease of the cutting operation by each drill based on the following standards. Evaluation results are shown in Table 2.

<Criterion for Evaluation>

◎ ... light (requiring little force for drilling)

○ ... relatively light (requiring a little force for drilling)

X ... heavy (requiring a large force for drilling)

TABLE 2

|  | Evaluation |
|---|---|
| Example 1 | ◎ |
| Example 2 | ◎ |
| Example 3 | ◎ |
| Example 4 | ○ |
| Comparative Example 1 | X |
| Comparative Example 2 | X |

As shown in Table 2, the drills in the examples (0<A≤B) were able to easily drill the metal plate compared to the drills (A>B) in the comparative examples. That is, the drilling resistance was small. In particular, the drills in the examples 1-3 (0<A<B) had very small drilling resistance.

<Test 2: Comparison 1 with Competitors' Products, Etc.>

Four kinds of drills (Ø8.5 mm in diameter) shown in Table 3 were prepared. The drill in the example 5 is a drill according to the present invention (see FIG. 1) and the drills in the comparative examples 3-5 have the configurations shown in FIG. 16(a)-(c), respectively.

TABLE 3

Figure 16:
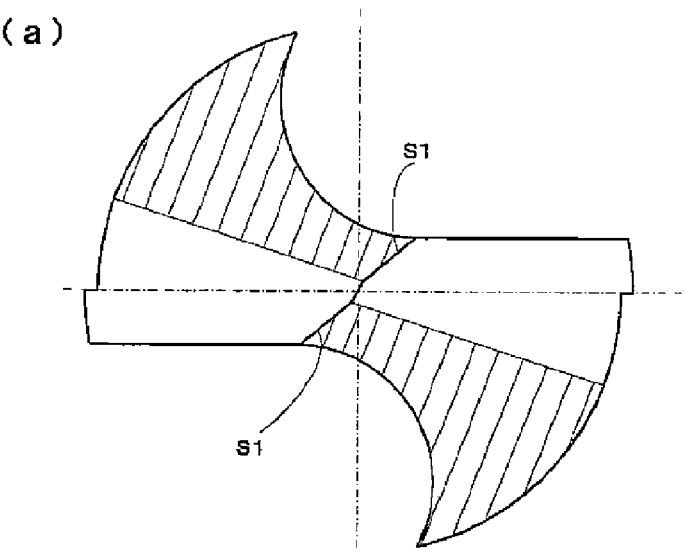
FIG. 16 It is a top view (a figure seeing the drill from the tip side) of the conventional drill.
Figure 16:
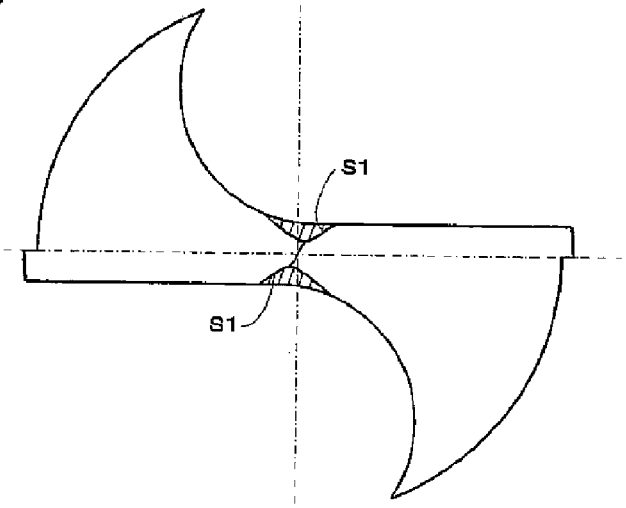
Figure 16:
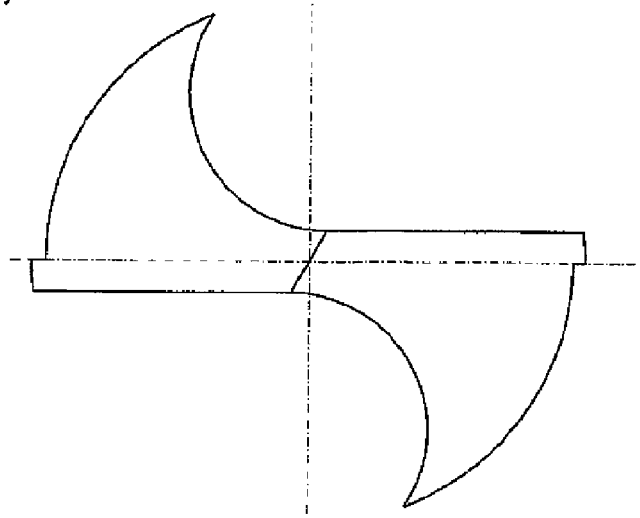

|  | Product Name | Configuration |
|---|---|---|
| Example 5 | Present Invention | FIG. 1 |
| Comparative Example 3 | Cobalt Masamune Drill manufactured by Ishihashi Seiko Co., Ltd | FIG. 16 (a) |
| Comparative Example 4 | General-purpose Drill manufactured by Mitsubishi Materials Kobe tools division | FIG. 16 (c) |
| Comparative Example 5 | Drill in the comparative example 4 on which thinning was performed by the applicant | FIG. 16 (b) |

Following the attachment of the drill in the above-mentioned example 5 and the comparative examples 3-5 to the rechargeable drill driver (manufactured by Panasonic), in all examples in Table 3, the same operator conducted a drilling operation on the metal plate (quality of the material SS400 and 9 mm in thickness) by manpower. When about 70% of the length from the drill tip to the peripheral cutting blade sank in the workpiece, drilling was temporarily stopped, and after checking the shape of the hole, drilling was continued until the peripheral cutting blade sank deeper. Evaluation results on each drill are shown in Table 4 and 5. Besides, the reason for having checked the hole shape is that the hole shape cannot easily become a cone shape if drilling resistance changes during operations.

TABLE 4

|  | Hole Shape | Drill behavior until the peripheral cutting blade sank in the workpiece |
|---|---|---|
| Example 5 | Cone Shape | Rotating smoothly, and not moved rattly until the peripheral cutting blade sank |
| Comparative Example 3 | Pentagon | Starting to move ratttly from the middle, and continued until the peripheral cutting blade sank |
| Comparative Example 4 | Triangle | Starting to move ratttly from the middle, and continued until the peripheral cutting blade sank |
| Comparative Example 5 | Triangle | Starting to move ratttly from the middle, and continued until the peripheral cutting blade sank |

TABLE 5

| | Drilling efficiency of the cutting blade and chips after the peripheral cutting blade sank in the workpiece |
|---|---|
| Example 5 | Very light. Fine consecutive chips were emitted. |
| Comparative Example 3 | Relatively light. Fine continuous chips were emitted. |
| Comparative Example 4 | Heavy. Intermittent chips were emitted for a while. |
| Comparative Example 5 | A little heavy. Continuous chips were emitted, but they are not fine. |

As seen clearly from Tables 4 and 5, since drilling resistance of the drills in the examples is smaller and they have less fluctuation compared to the drills of the comparative examples, drilling can be easily conducted with a small force and fine consecutive chips were emitted while drilling operation. Besides, at the sites where a part such as autoparts and electrical parts is manufactured in large quantities, consecutive chips with a possibility of coiling around a drill are not preferable because of a mechanical automation and unmanned operation. Therefore, drill manufacturers have given priority to the development of a drill suitable for automatic machines that do not emit consecutive chips. However, at the sites where a hand drill is used (for fitting of a railroad vehicle, etc.) or the sites where a manual drill press is used, since operators may just remove chips, operating efficiency improves as the drilling efficiency improves even if consecutive chips are emitted. In addition, chip clogging with a drill for deep holes is removed because of the emission of the chips along a drill groove.

<Test 3: Comparison 2 with Competitors' Products, Etc.>

Four kinds of drills (Ø6.5 mm in diameter) shown in Table 6 were prepared. The drill in the example 6 is a drill according to the present invention (see FIG. 1), and the drills in the comparative examples 6-8 have the configurations shown in FIG. 16(a)-(c), respectively. Besides, the reason that drill-diameter Ø was set as 6.5 mm is for making the peripheral cutting blade to reach a metal plate (3 mm in thickness) which will be mentioned later before the drill tip penetrates the metal plate.

TABLE 6

| | Product Name | Configuration |
|---|---|---|
| Example 6 | Present Invention | FIG. 1 |
| Comparative Example 6 | Cobalt Masamune Drill manufactured by Ishihashi Seiko Co., Ltd | FIG. 16 (a) |
| Comparative Example 7 | General-purpose Drill manufactured by Mitsubishi Materials Kobe tools division | FIG. 16 (c) |
| Comparative Example 8 | Drill in the comparative example 7 on which thinning was performed by the applicant | FIG. 16 (b) |

By using the drill press (manufactured by Kitagawa Iron Works Co., Ltd.) provided with the drills in the above-mentioned example 6 and the comparative examples 6-8, in all examples in Table 6, the same operator conducted an operation to drill a through hole in a metal plate (quality of the material SUS304, 3 mm in thickness, 60 mm in width, and 320 mm in length). The operation was conducted continuously and stopped when the operator judged that the drill was unusable (impossible to drill a hole), and then the operator evaluated the durability of the drill depending on the number of the drilled holes. Results are shown in Table 7.

TABLE 7

| | Results |
|---|---|
| Example 6 | Minor abrasions were found after drilling 100 holes, but the hole drilling was continued since the drilling resistance was nearly unchanged from the beginning. A small increase of the abrasions was found after drilling 200 holes, but the hole drilling was continued since no cracks were found and the drilling resistance was unchanged. Since minor cracks and progression of abrasions were found after drilling 300 holes, the hole drilling was stopped even though it seemed that the drilling can be still continued. |
| Comparative Example 6 | The hole drilling was stopped when drilling 100 holes since cracks were found in the periphery and thinning of the drill's edge part and the drilling resistance increased after drilling 98 holes. |
| Comparative Example 7 | The hole drilling was stopped since cracks and large abrasion were found in the periphery and thinning of the drill's edge part after drilling 24 holes. |
| Comparative Example 8 | The hole drilling was stopped since cracks and large abrasion were found in the periphery and thinning of the drill's edge part after drilling 30 holes. |

As seen clearly from Table 7, The drills in the examples has the durability that far exceeds that of the drills in the comparative examples against SUS304 which is a material more difficult to cut than a SS material.

<Test 4: Comparison with Applicant's Other Inventions>

Three kinds of drills (Ø8.2 mm in diameter) shown in Table 8 were prepared. The drill in the example 7 is a drill according to the present invention (see FIG. 8). The drill in the comparative example 9 is a drill that was described in Tokugan 2010-203777 (the prior application by the applicant), and the drill in the comparative example 10 is a drill that was described in said patent document 2. Besides, there is almost no difference in performance between qualities of the materials. In the drill in the example 6, a tilt angle between the whetstone for performing thinning and a drill axis was set as 27.5° (20-35° of mean value), and thinning of the drill was performed along the tangent line of the whetstone (thinning angle (see FIG. 4) θ=0°).

TABLE 8

| | Chisel Width | Helix Angle | Quality of Material |
|---|---|---|---|
| Example 7 | 0.5 mm | 30° | SKH59 |
| Comparative Example 9 | 0.38 mm | 32° | SKH56 |
| Comparative Example 10 | 0.3 mm | 32° | Powder High - Speed Steel |

By drilling holes in the workpiece (exchange panel, high-tensile steel plate of the Daihatsu Move car) with the above-mentioned three kinds of drills, the drilling efficiency and durability of the drills were checked. The hole drilling was performed to the same extent of the depth in all examples in Table 8 without drilling a through hole so as to avoid breakage. First, by drilling one hole at a time using the above-mentioned three kinds of drills, the drilling efficiency of the drills was checked. Results are shown in Table 9.

TABLE 9

| | Drilling efficiency |
|---|---|
| Example 7 | Cut very well. |
| Comparative Example 9 | Cut very well. |
| Comparative Example 10 | Cut well, requiring the most power among the three kinds of drills. |

The hole drilling was performed using the drills in the above-mentioned example 7 and the comparative examples 9-10. The operation was conducted continuously and stopped when the operator judged that the drill was unusable (impossible to drill a hole), and then the operator evaluated the durability of the drill depending on the number of the drilled holes. Results are shown in Table 10.

TABLE 10

| | Durability |
|---|---|
| Example 7 | Still possible to drill holes without requiring big power even after drilling 50 holes. |
| Comparative Example 9 | Stopped the operation since it seems to require big power after drilling 15 holes. |
| Comparative Example 10 | Cut well until 3 holes were made, but the drilling efficiency gradually deteriorated and it became very hard to cut after drilling 6 holes, and then stopped the operation since it seemed to require big power after drilling 9 holes. |

As seen clearly from Table 10, it turned out that the drill in the example 7 has both drilling efficiency and durability unlike the drills in the comparative examples 9 and 10. Moreover, Close-up observation of the tip of each drill showed that in the drills in the comparative examples 9 and 10 the chisel edges abraded largely, but on the other hand, in the drill in the example 6 the abrasion of the chisel edge was small and the whole blade edge abraded equally despite a number of holes in the drill in the example 6. Since the drill in the example 7 has the widest chisel width, it can be assumed that the power to push a operator's drill was distributed and the chisel edge was less subject to the abrasion compared to the drills in the comparative examples 9 and 10, allowing a large number of hole drilling. In addition, it is contemplated that the reason the drilling force equivalent to the one obtained from a narrow chisel width was acquired even if the chisel width was enlarged is that the drill had a rake angle suitable for drilling.

2. Test based on the shape of thinning

In the above-mentioned Test 1-4, it was confirmed that the drill which satisfies 0<A≤B is excellent in drilling efficiency compared with the drill which does not satisfy the same (A>B). However, as a result of further additional tests, the inventors have discovered that a drill which has a thinning surface of the specific shape may obtain excellent drilling efficiency even if the drill does not satisfy 0<A≤B. The results of the additional tests are shown below.

Figure 4:
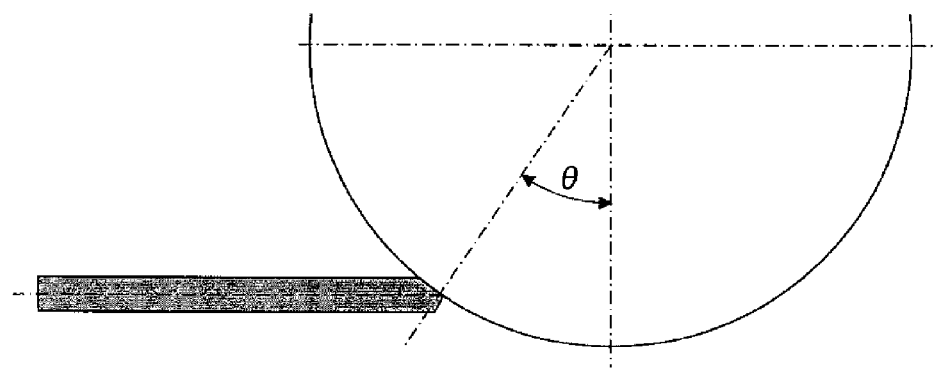
FIG. 4 It shows an angle at which a drill is applied to a whetstone at the time of thinning formation.
Figure 4:
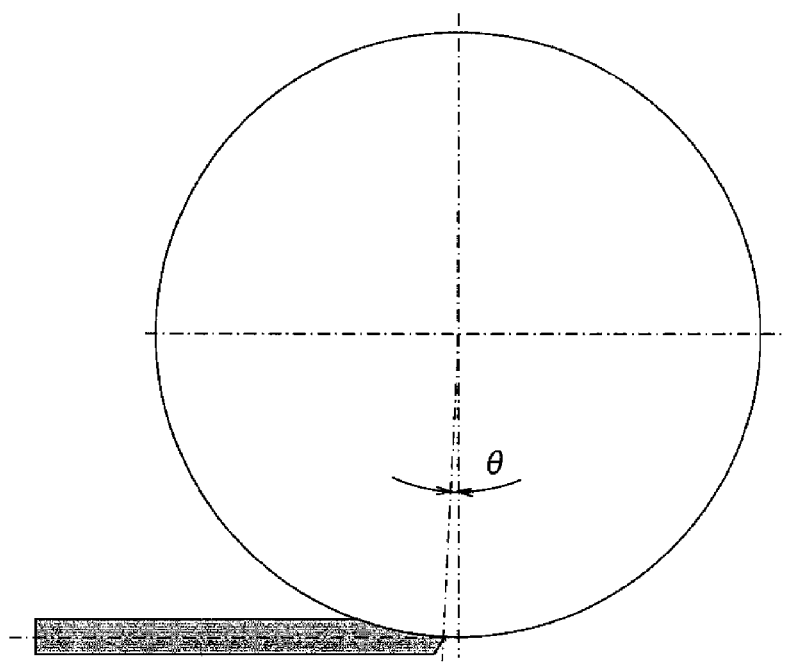

Additionally, all of the drills in the above-mentioned examples 1-7 have a thinning surface in a specific shape, and all of the drills in the comparative examples 1-10 do not have thinning surface in the specific shape. Supplemental explanations on the drill used in the above-mentioned Test 1 (the examples 1-4 and comparative examples 1 and 2) are given with regard to this point. In the Test 1, five kinds of sizes of thinning were performed for one kind of drill mainly for the purpose of setting the proportion of A:B. Thinning was performed by creating the whetstone mainly used for allowing for 4.5 mm thinning on the drill, especially the whetstone shown in FIG. 13 (2). Since all of the chisel widths were set as 0.5 mm, the length of the thinning cutting blade (B) was adjusted by changing θ described in FIGS. 4 (a) and (b). As a result, in the examples 1-4 thinning was shaped in a state as shown in FIG. 4 (b) in which the whetstone made a deep contact with the groove of the drill (θ<20°), although in the comparative examples 1 and 2 thinning had to be shaped in a state nearly as shown in FIG. 4 (a) in which the whetstone made a relatively shallow contact with the groove of the drill. (Thus, the result was θ>20°.) Therefore, the drills in the examples 1-4 have the thinning surfaces of the above-mentioned specific shapes. But on the other hand, in the comparative examples 1 and 2 the shapes when seeing from the sides of the drill tips became as arc shapes nearly as shown in FIG. 16 (b), and the thinning surfaces shaped by the thinning cutting blades did not become substantially parabolic shapes, inclining toward the drill axis directions when seeing from the front side of the drills, but became shapes as nearly mere circles. Besides, it did not appear inclined toward the drill axis directions.

<Test 5: Additional Test 1>

(1) Setting of a Drill Diameter

Based on the actual situation of work sites, the drill diameter was set as followings three types which are base hole diameters of the screws.

1. M4: Ø3.3 mm
2. M5: Ø4.2 mm
3. M6: Ø5.2 mm (2) Manufacture and Test of the Drills in the Examples For the above-mentioned three kinds of diameters, the drills in the examples 8-10 were manufactured on three conditions shown in Table 11.

TABLE 11

Figure 12:
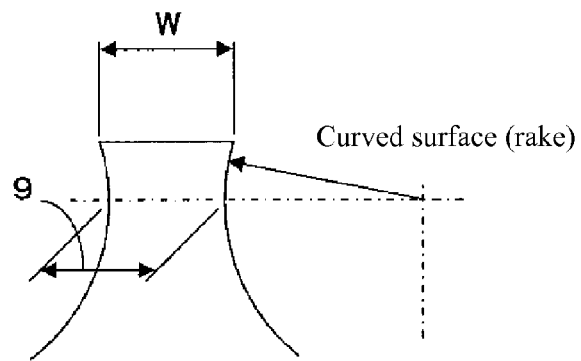
FIG. 12 It is across sectional view cutting the drill according to the present invention in the longitudinal direction (the direction of drill length) along the chisel, and (a) is the drill of the third embodiment, (b) is the drill of the fourth embodiment, and (c) is the drill of the fifth embodiment.
Figure 12:
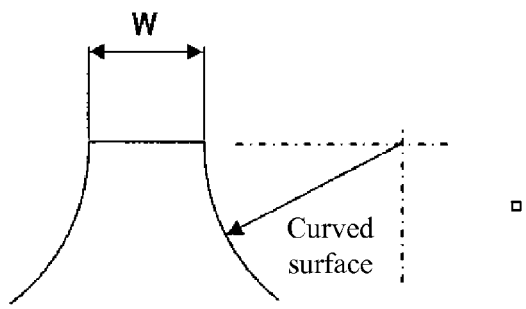
Figure 12:
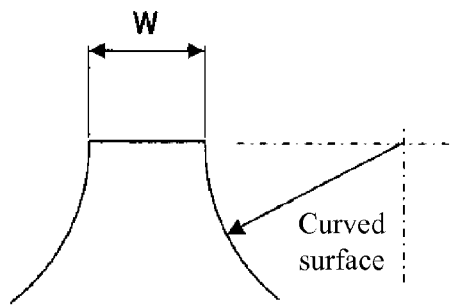

| | Drill Diameter (mm) | Drill Shape | Chisel Width (W) |
|---|---|---|---|
| Example 8 | Ø3.3 | FIG. 9, FIG. 12 (a) | 0.23 mm |
| Example 9 | Ø4.2 | FIG. 11, FIG. 12 (c) | 0.32 mm |
| Example 10 | Ø5.2 | FIG. 10, FIG. 12 (b) | 0.34 mm |

By using the drills in the above-mentioned examples 8-10, hole drilling tests were conducted to drill one hole in the workpieces (SUS304 steel plates: 3 mm in thickness×100 mm×500 mm) with the drill press (manufactured by Kitagawa Industries Co., Ltd., Model Number KFS-410 (used at 320 rpm/60 Hz)), time required for one hole drilling was measured, and chip shapes were observed. Results are shown in Table 12.

TABLE 12

| Drill | Example 8 | Example 9 | Example 10 |
|---|---|---|---|
| Hole Drilling Time (second) | 14.6 | 16.7 | 21.4 |
| Chip Shape | Long Curly Shape | Long Curly Shape | Long Curly Shape |

Following the hole drilling tests with the drill press, by using the same drills in the above-mentioned examples 8-10, hole drilling tests were conducted to drill holes in the same workpieces with the pneumatic drill (hand drill) (manufactured by KTS. Co., Ltd., MODEL AT12M, idling speed: 1200 rpm). The workpieces were fixed vertically using the vise, and the hole drilling was conducted to rectangular directions in the workpieces with the drills in the examples 8-10 in a horizontal state. (Since the horizontal hole drilling depends largely on the arm strength of the operators as they can not place their body weights on the drill compared to the hole drilling to the perpendicular directions, the drilling force (drilling efficiency) is likely to be reflected in numerical values.) Air pressure that drives a pneumatic drill was set as 6-8 kg/mm². In addition, since drilling time changes depending on the arm strength of the operators, the hole drilling was conducted 3 times for each drill respectively to calculate average values. Chip shapes were also observed. Results are shown in Table 13.

TABLE 13

|  |  | 1 | 2 | 3 | Average |
|---|---|---|---|---|---|
| Example 8 | Time (second) | 10.9 | 8.1 | 7.6 | 8.87 |
|  | Chip Shape |  | Curly Shape |  |  |
| Example 9 | Time (second) | 9.6 | 12.2 | 10.1 | 10.63 |
|  | Chip Shape |  | Curly Shape |  |  |
| Example 10 | Time (second) | 16.5 | 12.9 | 15.4 | 14.93 |
|  | Chip Shape |  | Curly Shape |  |  |

(3) Manufacturing and Test of the Drills in the Comparative Examples

For the above-mentioned three kinds of diameters, the drills in the comparative examples 11-13 were manufactured on three conditions shown in Table 14.

TABLE 14

|  | Drill Diameter (mm) | Drill Shape |
|---|---|---|
| Comparative Example 11 | Ø3.3 | Drill described in Tokukaihei7-164228 (Publication 1) |
| Comparative Example 12 | Ø4.2 | Drill described in Tokukai2000-271811 (Publication 2) |
| Comparative Example 13 | Ø5.2 | Drill described in Tokukaihei7-40119 (Publication 3) |

(3-1) The Drill in the Comparative Example 11

Since the drill of the comparative example 11 is below Ø3.175 mm including a curved line in thinning, it was manufactured based on a Ø3.3 mm of drill whose diameter is practically the closest to the diameter of the drill below Ø3.175 mm and compared with the test results in the example 8. The other size of the drill in the comparative example 11 is shown below (see Publication 1).

Chisel width: 0.15 mm
Tilt angle of cutouts α: 60°
Axial length of cutouts d: 1.21 mm
Rake angle: −10°

(3-2) The Drill in the Comparative Example 12

The drill in the comparative example 12 has a +5~15° of rake angle in thinning. It was manufactured based on a Ø4.2 mm of drill and compared with the test results in the example 9. The other size of the drill in the comparative example 12 is shown below (see Publication 2).

Chisel width: 0.19 mm
Rake angle: +5°

(3-3) The Drill in the Comparative Example 13

Since the drill in the comparative example 13 has a feature that its thinning part (thinning cutting blade) is longer than its cutting blade part (main cutting blade), it was manufactured based on a Ø5.2 mm of drill and compared with the test results in the example 10 where the shape of the thinning part in which the length of the thinning part becomes longer offsets a cutting blade. The other size of the drill in the comparative example 13 is shown below (see Publication 3).

Chisel width: 0.22 mm
L1: 0.86 mm
L2: 1.83 mm
L2/L1=2.13 (satisfying L2=1.3×L1~3.0×L1)
Rake angle: −5°

For the drills in the comparative examples 11-13, at the beginning, the chisel width was set to the same width as that in the drills in the examples, but as the drilling efficiency was very bad, chisel width that was set as 4 to 5% of drill diameters were manufactured again. Considering that the drills in the comparative examples 11-13 is for stainless steel workpiece, time spent in drilling one hole measured with the order of the drill press and then the hand drill as two or more consecutive hole drilling is not guaranteed. (Because of a high possibility that the cutting blade will break in the hole drilling with the hand drill, we contemplated that in advance, damage of the blade edge will be reduced by drilling hole with the drill press.)

By using the drills in the comparative examples 11-13, hole drilling tests were conducted with the drill press as conducted in the examples 8-10, time required for the hole drilling was measured, and chip shapes were observed. Results were shown in Table 15.

TABLE 15

| Drill | Comparative Example 11 | Comparative Example 12 | Comparative Example 13 |
|---|---|---|---|
| Hole Drilling Time (second) | 45.4 | 42.3 | 56.3 |
| Chip Shape | Powdery shape + thready shape generated in penetrating a through hole | Powdery shape + curly shape generated in the middle of drilling hole | Powdery shape + curly shape generated in penetrating a through hole |

After the hole drilling tests were conducted with the above-mentioned drill press, by using the same drills in the above-mentioned examples 8-10, hole drilling tests were conducted with the pneumatic drill (hand drill) as conducted in the examples 8-10, time required for the hole drilling was measured, and chip shapes were observed. Results are shown in Table 16.

TABLE 16

|  |  | 1 | 2 | 3 | Average |
|---|---|---|---|---|---|
| Comparative Example 11 | Time (second) | 43.0 | 46.1 | 45.5 | 44.87 |
|  | Chip Shape |  | Powdery shape |  |  |
| Comparative Example 12 | Time (second) | 32.3 | 34.4 | 35.9 | 34.2 |
|  | Chip Shape |  | Powdery shape + A Little Curly shape generated in penetrating a through hole |  |  |
| Comparative Example 13 | Time (second) | 53.1 | 56.3 | 68.2 | 59.2 |
|  | Chip Shape |  | Powdery shape |  |  |

(4) Comparisons

The test results in the examples and comparative examples (time required for the hole drilling (second)) were compared for the drills of the same diameters. Results are shown in Table 17.

TABLE 17

| Drill Diameter Ø3.3 mm | | |
| --- | --- | --- |
| | Example 8 | Comparative Example 11 |
| Drill Press | 14.6 | 45.4 |
| Pneumatic Drill (average) | 8.87 | 44.87 |

| Drill Diameter Ø4.2 mm | | |
| --- | --- | --- |
| | Example 9 | Comparative Example 12 |
| Drill Press | 16.7 | 42.3 |
| Pneumatic Drill (average) | 10.63 | 34.2 |

| Drill Diameter Ø5.2 mm | | |
| --- | --- | --- |
| | Example 10 | Comparative Example 13 |
| Drill Press | 21.4 | 56.3 |
| Pneumatic Drill (average) | 14.93 | 59.2 |

As shown in Table 17, it was confirmed that the drills in the examples can drill holes at the speed of 2 to 3 times or more compared with the drills in the comparative examples. It is considered that there is little difference in the hole drilling time depending on the thinning position of the drills in the examples (difference in the examples 8-10) since the hole drilling time slightly increased with the increase in the drill diameter. It is considered that the reason the hole drilling time with the pneumatic drill (hand drill) is shorter compared with the drill press is that the drill press was set to the minimum rotational rate (320 rpm/60 Hz). (Considering a drill diameter Ø3.3-5.2 mm, it seemed that the rotational rate twice or more as much as the minimum rotational rate should be suitable, but the test was carried out with the minimum rotational rate to avoid breakage of the drill itself during the test.) Although in the drills in the comparative examples time required for hole drilling tends to increase with the increasing number of hole drilling and the drilling efficiency seemed to gradually decrease, except for some results (the second time and the third time in the comparative example 11 are reversed), there was no similar trend and the drilling efficiency did not found to decrease in the drills in the examples. The fact that the curly chips were emitted with reference to the drills in the examples and on the other hand the powdery chips were emitted with reference to the drills in the comparative examples also shows that the drills in the examples are superior in drilling efficiency than the drills in the comparative examples.

<Test 6: Additional Test 2>

After completing the above-mentioned additional test 1, the drills in the examples 8-10 and the drills in the comparative examples 11-13 were still used, and these drills were attached to the above-mentioned drill press to consecutively drill multiple through holes in the same workpiece as shown in the above-mentioned additional test 1. The cutting blades of the drills were checked at any time with careful attention to a noise during drilling or a change in resistance. When damages enough to create cutting problems (cracks, abrasions, etc.) occurred in the cutting blades, the hole drilling was stopped, and the number of the through holes drilled by then was counted. Also, shapes of the chips were observed. Besides, in the drills in the examples 8-10, before damages which is enough to create drilling problems occur, the hole drilling was stopped due to the size of the workpiece used (all the space for hole drilling was used). The test results in the drills in the examples are shown in Table 18 and the test results in the drills in comparative examples are shown in Table 19.

TABLE 18

| | Example 8 | Example 9 | Example 10 |
| --- | --- | --- | --- |
| The number of through holes | 366 or more | 288 or more | 264 or more |
| Test status | When a noise seemed to slightly get louder after drilling 290 holes, a small crack was found in one side of thinning parts, but the test was continued since there was no problem occurred in drilling. After drilling 366 holes, the crack in the same spot was found bigger, but the drill was able to drill a through hole in 22.7 seconds after it was equipped with the pneumatic drill. | When a noise seemed to slightly get louder after drilling 250 holes, a small crack was found in one side of thinning parts, but the test was continued since there was no problem occurred in drilling. After drilling 288 holes, the crack in the same spot was found bigger and cracks in both peripheral cutting blades were also found, but the drill was able to drill a through hole in 31.8 seconds after it was equipped with the pneumatic drill. | After drilling 264 holes, no crack was found in whole except for an abrasion of a chisel and the drill was still usable. The drill was able to drill a through hole in 21.3 seconds after it was equipped with the pneumatic drill. |
| Cutting noise | Almost nothing | Almost nothing | With the abrasion of the chisel, a rustling noise came out a little when a tip of the drill contacted with the workpiece after drilling 220 holes, but there were almost no other noises. |
| Chip shape | Long curly shape as obtained by extending transversely a sine curve along a groove shape of the drill | Long curly shape as obtained by extending transversely a sine curve along a groove shape of the drill | Long curly shape similar to a sine curve |

TABLE 19

|  | Comparative Example 11 | Comparative Example 12 | Comparative Example 13 |
|---|---|---|---|
| The number of through holes | 21 | 66 | 67 |
| Test status | When the drill became difficult to cut after drilling 21 holes, we checked and found that a chisel part was missing. Thus the test was stopped. | The drilling efficiency of the drill significantly deteriorated after drilling about 50 holes, but the test was forcibly continued. When the drill became difficult to cut after drilling 66 holes, we checked and found an abrasion in thinning part and a crack in the peripheral cutting blade. Thus the test was stopped. | When the drilling efficiency of the drill significantly deteriorated suddenly after drilling about 60 holes, we checked and found an abrasion in the chisel part. The test was stopped when a noise got considerably louder after drilling 67 holes. |
| Cutting noise | There was a crunchy noise all the time which is peculiar to a stainless steel. | A crunchy noise started to come out after drilling about 30 holes, and it became considerably louder after drilling 66 holes. | There was a crunchy noise from the beginning, and it became considerably louder after drilling 67 holes. |
| Chip shape | Powdery shape | Powdery shape | Powdery shape |

As shown in Table 18 and 19, it was confirmed that the drills in the examples are able to drill at least about 4 times (comparison with the example 10 and the comparative example 13) to about 17 times (comparison with the example 8 and the comparative example 11) of holes compared with the drills in the comparative examples. It is considered that there is little difference (in the examples 8-10) depending on the thinning position between the drills in the examples. Fine curly chips similar to a sine curve were emitted from the drills in the examples. Chips in such shapes can often be seen for an aluminum as the workpiece, but hardly be seen for a stainless steel, which reveal that the drills are very excellent in drilling efficiency. On the other hand, powdery chips are emitted from the drills in the comparative examples. Therefore, the drills in the examples are found to be significantly superior in drilling efficiency to the drills in the comparative examples.

INDUSTRIAL APPLICABILITY

The present invention is suitably used for the drill employed in a manual hole drilling operation using a hand drill, a drill press, or the like is used.

EXPLANATIONS OF NUMERALS

1 Thinning cutting blade
2 Main cutting blade
3 Clearance face
4 Chisel
5 Rake face shaped by main cutting blade
6 Rake face shaped by thinning
7 Central part of drill tip
8 Thinning surface shaped by thinning cutting blade
9 Portion whose width in direction parallel to chisel is narrower than chisel width
10 Rake face forming rake angle
A Length of main cutting blade
B Length of thinning cutting blade
C Drill axis direction
D Extension line extending in drill tip direction line along the deepest portion of thinning surface
d Length of offset
R Drill radius
$\theta1$ Rake angle formed by main cutting blade
$\theta2$ Rake angle formed by thinning cutting blade
$\alpha1$ Included angle formed by main cutting blade
$\alpha2$ Included angle formed by thinning cutting blade
$\beta$ Clearance angle
$\gamma$ Tilt angle of thinning surface
R1 Radius shaping rake face by main cutting blade
R2 Radius shaping rake face by thinning
W Chisel width
$\theta$ Angle of contacting drill with whetstone at the time of thinning formation

The invention claimed is:

1. A drill with a tip part on which thinning is performed, comprising two cutting blades which are formed symmetrical about an axis of rotation,
    said cutting blades consisting of a thinning cutting blade extending from a chisel edge toward a peripheral side of the drill to become a shape including curves, and a main cutting blade extending from an end part of said thinning cutting blade to the peripheral end of the drill, when seen from tip side of the drill,
    wherein a ridge line of a boundary between a slot for emitting chips and a thinning surface shaped by said thinning cutting blade is substantially u-shaped, inclining toward the drill axis direction and toward a direction in which the ridge line moves from the thinning cutting blade side to the main cutting blade side as it moves from the drill's tip side to the base end side, when seen from front side of the drill which is an aperture side of said slot, and
    wherein a rake angle $\theta1$ formed by said main cutting blade and a rake angle $\theta2$ formed by said thinning cutting blade satisfy $\theta1 > \theta2 > 0°$, except for a part just below the chisel.

2. The drill according to claim 1, wherein an extension line extending in a drill tip direction a line along the deepest portion of said thinning surface is offset to heel side or cutting blade side of the drill, without crossing the central part of the drill tip, when seen from said front side of the drill.

3. The drill according to claim 2, wherein width of said offset is equal to or smaller than 10% of a drill diameter.

4. The drill according to claim 3, wherein said extension line is offset to the heel side of the drill.

5. The drill according to claim 4, wherein a rake angle is formed in a part including a part just below the chisel of said thinning cutting blade.

6. The drill according to claim 3, wherein said extension line is offset to the cutting blade side of the drill.

7. The drill according to claim 6, wherein a rake angle is formed in a part which is adjacent to but does not include a part just below the chisel of said thinning cutting blade.

8. The drill according to claim 3, wherein a rake angle is formed in a part including a part just below the chisel of said thinning cutting blade.

9. The drill according to claim 3, wherein a rake angle is formed in a part which is adjacent to but does not include a part just below the chisel of said thinning cutting blade.

10. The drill according to claim 2, wherein said extension line is offset to the heel side of the drill.

11. The drill according to claim 10, wherein a rake angle is formed in a part including a part just below the chisel of said thinning cutting blade.

12. The drill according to claim 2, wherein said extension line is offset to the cutting blade side of the drill.

13. The drill according to claim 12, wherein a rake angle is formed in a part which is adjacent to but does not include a part just below the chisel of said thinning cutting blade.

14. The drill according to claim 2, wherein a rake angle is formed in a part including a part just below the chisel of said thinning cutting blade.

15. The drill according to claim 2, wherein a rake angle is formed in a part which is adjacent to but does not include a part just below the chisel of said thinning cutting blade.

16. The drill according to claim 1, wherein an extension line extending in a drill tip direction a line along the deepest portion of said thinning surface crosses the central part of the drill tip, when seen from said front side of the drill.

17. The drill according to claim 16, wherein a rake angle is formed in a part which is adjacent to but does not include a part just below the chisel of said thinning cutting blade.

* * * * *